(12) United States Patent
Ikemura et al.

(10) Patent No.: US 10,816,402 B2
(45) Date of Patent: Oct. 27, 2020

(54) SPECTROMETRY DEVICE AND SPECTROMETRY METHOD

(71) Applicant: HAMAMATSU PHOTONICS K.K., Hamamatsu-shi, Shizuoka (JP)

(72) Inventors: Kenichiro Ikemura, Hamamatsu (JP); Kazuya Iguchi, Hamamatsu (JP); Shigeru Eura, Hamamatsu (JP); Akihiro Nakamura, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 0 days.

(21) Appl. No.: 16/612,469

(22) PCT Filed: Apr. 2, 2018

(86) PCT No.: PCT/JP2018/014094
§ 371 (c)(1),
(2) Date: Nov. 11, 2019

(87) PCT Pub. No.: WO2018/211839
PCT Pub. Date: Nov. 22, 2018

(65) Prior Publication Data
US 2020/0096389 A1    Mar. 26, 2020

(30) Foreign Application Priority Data

May 17, 2017   (JP) ................. 2017-098284

(51) Int. Cl.
*G01J 3/30*   (2006.01)
*G01J 3/443*   (2006.01)
*G01J 3/02*   (2006.01)

(52) U.S. Cl.
CPC ............ *G01J 3/443* (2013.01); *G01J 3/0254* (2013.01)

(58) Field of Classification Search
CPC .... G01N 21/67; G01N 21/69; G01N 21/3103; G01N 21/62; G01J 3/443
(Continued)

(56) References Cited

U.S. PATENT DOCUMENTS

2011/0205537 A1* 8/2011 Iguchi ................. G01J 3/0254
356/326
2012/0069343 A1* 3/2012 Toriumi ............... G01N 21/474
356/446

FOREIGN PATENT DOCUMENTS

JP    2004-309323 A    11/2004
JP    2005-121385 A    5/2005
(Continued)

OTHER PUBLICATIONS

International Preliminary Report on Patentability dated Nov. 28, 2019 for PCT/JP2018/014094.

*Primary Examiner* — Md M Rahman
(74) *Attorney, Agent, or Firm* — Faegre Drinker Biddle & Reath LLP

(57) ABSTRACT

A spectrometry device includes: an integrating sphere which includes an inner wall surface and an attachment hole; an adapter which includes a guide hole guiding the measurement target light and is disposed in the integrating sphere; a plate which includes a first surface covering the guide hole from the outside of the integrating sphere and allowing a sample to be mounted thereon and a second surface and through which the measurement target light is transmitted; a holder which includes a concave portion mounting the plate thereon and is attached to the attachment hole; and a spectral detector configured to detect the measurement target light. The concave portion includes a bottom surface facing the second surface and a side surface surrounding the periphery of the plate. The bottom surface and the side surface are (Continued)

coated with a reflective material reflecting the measurement target light.

11 Claims, 17 Drawing Sheets

(58) Field of Classification Search
USPC .......................................................... 356/311
See application file for complete search history.

(56) References Cited

FOREIGN PATENT DOCUMENTS

| | | |
|---|---|---|
| JP | 2007-198983 A | 8/2007 |
| JP | 3173730 U | 2/2012 |
| JP | 2012-227201 A | 11/2012 |
| JP | 2014-149267 A | 8/2014 |
| WO | WO-2008-107947 A1 | 9/2008 |

* cited by examiner

Fig.8
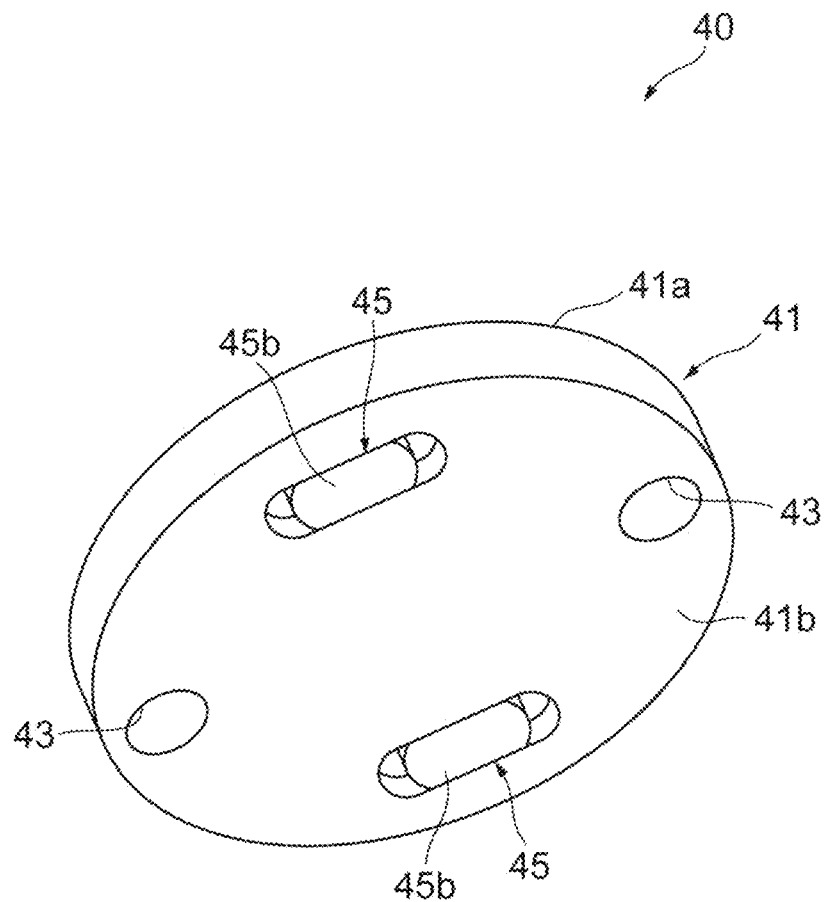
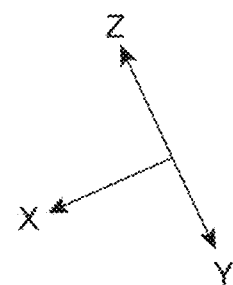

Fig.13
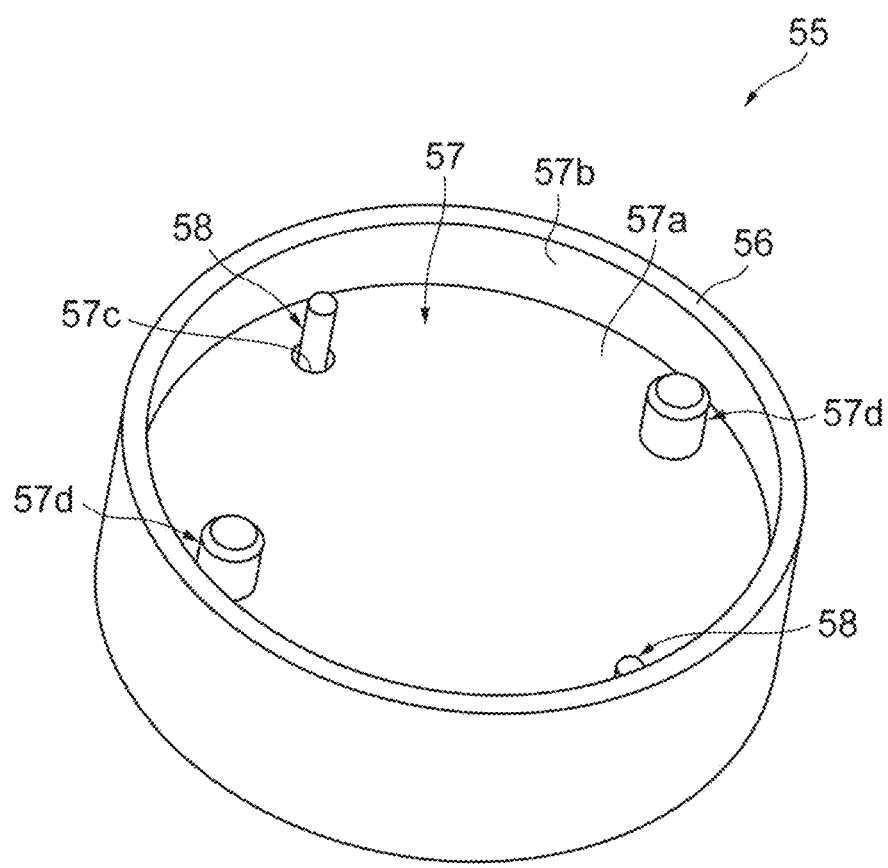
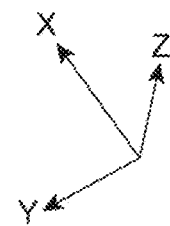

*Fig.17*
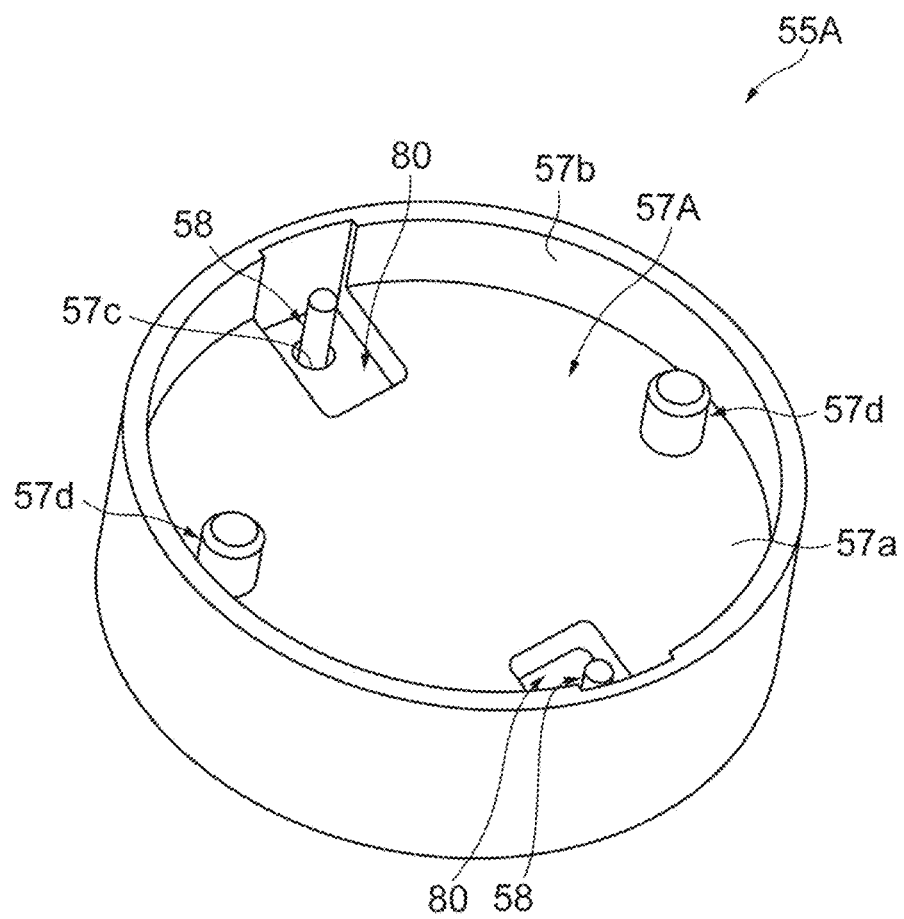
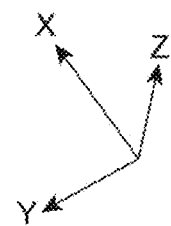

SPECTROMETRY DEVICE AND SPECTROMETRY METHOD

TECHNICAL FIELD

The present disclosure relates to a spectrometry device and a spectrometry method.

BACKGROUND ART

Patent Literature 1 discloses a measurement device which measures the quantum efficiency of a light emitting element. This measurement device includes an integrating sphere in which a light emitting element is disposed, a drive/measurement circuit which drives the light emitting element by a current, and a measurement device which measures a light emission spectrum of the light emitting element. The light emitting element is mounted on a mounting surface of a stage which is movable up and down by an up/down mechanism and is exposed into the integrating sphere. In this measurement device, the light emitting element is driven by a current using the drive/measurement circuit and the light emission characteristics (spectrum distribution) of measurement target light emitted from the light emitting element at that time are measured. Further, in this measurement device, an excitation light inlet into which excitation light is incident is provided in the integrating sphere so that the light emitting element is irradiated with the excitation light. Accordingly, the light emission characteristics of fluorescence emitted from the light emitting element are measured.

CITATION LIST

Patent Literature

Patent Literature 1: Japanese Unexamined Patent Publication No. 2004-309323
Patent Literature 2: Japanese Unexamined Patent Publication No. 2007-198983

SUMMARY OF INVENTION

Technical Problem

For example, as an item for evaluating the light emission characteristics of the light emitting element (sample) such as an LED, external quantum efficiency which is defined by a ratio of the number of photons discharged to the outside of the sample with respect to the number of injected electrons. The external quantum efficiency is measured by an electroluminescence (EL) method. Further, the external quantum efficiency is also defined by a light emission quantum yield which is a ratio of the number of photons of light emitted from the sample with respect to the number of photons of excitation light absorbed by the sample. The light emission quantum yield is measured by using a photoluminescence (PL) method. Further, as an item for evaluating the light emission material used in the light emitting element, internal quantum efficiency is known. This internal quantum efficiency may be considered as a ratio of the charge extracted from the sample with respect to the number of photons of excitation light absorbed by the sample. In the measurement of these quantum efficiencies (also referred to as the quantum efficiency), for example, a measurement device described in Patent Literature 1 is used. Here, in order to measure the quantum efficiency of the sample with high accuracy, it is desirable to reflect the measurement target light emitted from the sample, for example, at a high reflectance substantially close to 100% within the integrating sphere.

However, in the measurement device described in Patent Literature 1, the mounting surface exposed into the integrating sphere absorbs the measurement target light. Thus, it is difficult to highly accurately measure the value of the quantum efficiency of the sample. Further, in the measurement device, since the sample directly contacts the reflection surface (the mounting surface) even when the mounting surface exposed into the integrating sphere is coated with a reflective material, there is concern that the reflection surface may be scratched or contaminated. In this way, when the reflection surface is scratched or contaminated, the reflectance of the measurement target light decreases in a portion which is scratched or contaminated in the reflection surface so that the measurement target light is absorbed. Thus, also in this case, it is difficult to highly accurately measure characteristics of the sample such as quantum efficiency.

The disclosure has been made in view of such problems and an object thereof is to provide a spectrometry device and a spectrometry method capable of measuring characteristics of a sample with high accuracy.

Solution to Problem

A spectrometry device of the disclosure is a spectrometry device for measuring measurement target light emitted from a sample, including: an integrating sphere which includes an inner wall surface reflecting the measurement target light and an attachment hole extending outward from the inner wall surface; an adapter which includes a guide hole guiding the measurement target light and is disposed in the attachment hole; a plate which includes a first surface covering the guide hole from the outside of the integrating sphere and allowing the sample to be mounted thereon and a second surface disposed on the side opposite to the first surface and through which the measurement target light is transmitted; a holder which includes a concave portion accommodating the plate and is attached to the integrating sphere; and a spectral detector which detects the measurement target light output from the integrating sphere, in which the concave portion includes a bottom surface facing the second surface and a side surface surrounding the periphery of the plate, and in which the bottom surface and the side surface are coated with a reflective material reflecting the measurement target light.

A spectrometry method of the disclosure is a spectrometry method of measuring measurement target light emitted from a sample by using an integrating sphere including an inner wall surface reflecting the measurement target light and an attachment hole extending outward from the inner wall surface, including: a mounting step of mounting the sample on a first surface of a plate which includes the first surface and a second surface disposed on the side opposite to the first surface and through which the measurement target light is transmitted; an accommodating step of accommodating the plate in a concave portion of a holder including the concave portion provided with a bottom surface facing the second surface and a side surface surrounding the periphery of the plate; a disposing step of disposing an adapter with a guide hole guiding the measurement target light on the plate so that the guide hole is covered by the first surface from the outside of the integrating sphere, attaching the holder to the integrating sphere, and disposing the adapter in the attachment hole; and a detecting step of detecting the measurement target light output from the integrating sphere by a spectral detector, in which the bottom surface and the side surface are coated with a reflective material reflecting the measurement target light.

In the spectrometry device and the spectrometry method of the disclosure, the measurement target light emitted from the sample is repeatedly reflected inside the integrating sphere. Here, the measurement target light which is incident to the first surface of the plate is transmitted through the plate, is reflected by the bottom surface and the side surface coated with the reflective material of the concave portion of the holder, and is again returned into the integrating sphere so that the light is repeatedly reflected. In this way, since the bottom surface and the side surface of the concave portion within the integrating sphere reflect the measurement target light, it is possible to create a situation in which the sample is disposed inside the integrating sphere in a pseudo manner. Accordingly, it is possible to measure the characteristics of the sample with high accuracy.

The plate may be fitted to the side surface. In the accommodating step, the plate may be accommodated so as to be fitted to the side surface of the concave portion. Accordingly, it is possible to easily perform a relative positioning operation of the plate with respect to the holder.

The plate may further include a first electrode exposed to the first surface and a second electrode exposed to the second surface and the first electrode and the second electrode may be electrically connected to each other. Accordingly, it is possible to electrically connect an external device to the sample on the first surface through the first electrode and the second electrode.

The plate may further include a through-hole extending from the first surface to the second surface and a first conductor provided inside the through-hole and the first conductor may electrically connect the first electrode to the second electrode. Accordingly, it is possible to decrease the size of the first electrode exposed into the integrating sphere as small as possible.

The concave portion may further include a hole portion provided in the bottom surface and a second conductor provided inside the hole portion and the second conductor may be electrically connected to the second electrode. Accordingly, it is possible to electrically connect an external device to the sample on the first surface, for example, only by mounting the plate on the concave portion of the holder so that the electrode contacts the second electrode.

The above-described spectrometry device may further include a power source which is electrically connected to the second conductor. Accordingly, it is possible to supply at least one of a current and a voltage to the sample.

The above-described spectrometry device may further include an electric detector which is electrically connected to the second conductor and detects at least one of a current and a voltage generated in the sample. Accordingly, it is possible to detect, for example, at least one of a current and a voltage generated in the sample by the irradiation of the excitation light.

The adapter may further include a pressing portion which presses the plate against the bottom surface. In the disposing step, the adapter may be attached to the holder so that the plate is pressed against the bottom surface of the concave portion. Since the disposing step and the pressing portion are provided, it is possible to easily hold the plate within the concave portion by a simple operation. Accordingly, it is possible to suppress a risk that the concave portion is scratched or contaminated at the time of fixing the plate to the holder. That is, it is possible to further suppress a decrease in reflectance of the measurement target light within the concave portion. Thus, it is possible to measure the characteristics of the sample with higher accuracy.

The thickness of the plate may be equal to or smaller than the height of the side surface from the bottom surface. When the thickness of the plate is thicker than the height of the side surface, there is concern that the measurement target light may be separated from the side surface to be absorbed by other components. Therefore, since the thickness of the plate is equal to or smaller than the height of the side surface from the bottom surface, it is possible to suppress the measurement target light from being separated from the side surface and absorbed by other components. Thus, it is possible to measure the characteristics of the sample with higher accuracy.

The guide hole may have a tapered shape which increases in diameter toward a center portion of the integrating sphere. Accordingly, since the shape of the guide hole can be made similar to the shape of the inner wall surface of the integrating sphere, it is possible to measure the measurement target light with higher accuracy. That is, it is possible to measure the characteristics of the sample with higher accuracy.

Advantageous Effects of Invention

According to the disclosure, it is possible to measure the characteristics of the sample with high accuracy.

BRIEF DESCRIPTION OF DRAWINGS

FIG. 8 is a perspective view illustrating the plate from an oblique lower side.

FIG. 13 is a perspective view of a mounting portion.

FIG. 17 is a perspective view of a mounting portion according to a modified example.

DESCRIPTION OF EMBODIMENTS

Figure 1:
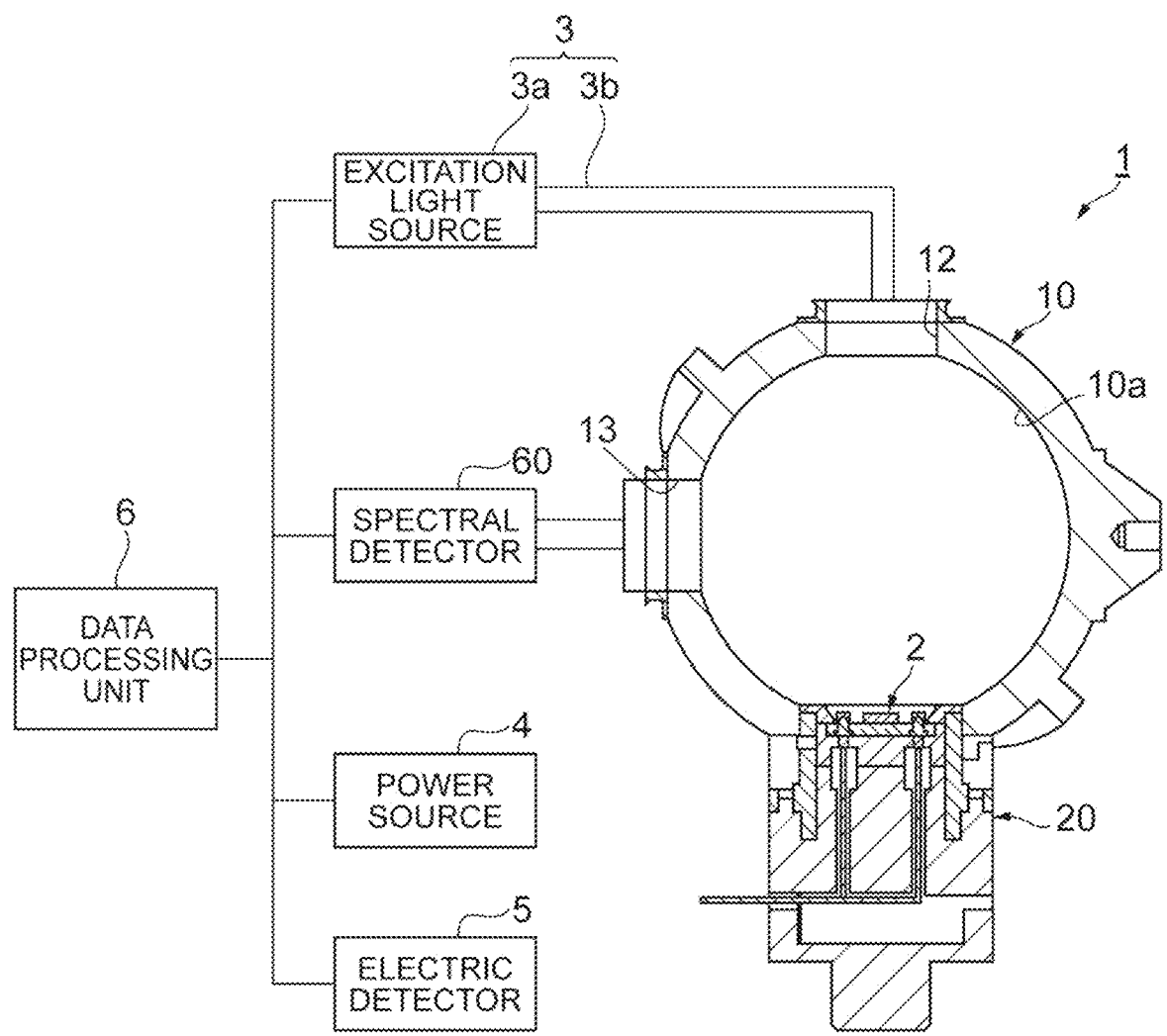
FIG. 1 is a diagram schematically illustrating a configuration of a spectrometry device of an embodiment.

Hereinafter, embodiments of a spectrometry device and a spectrometry method of the disclosure will be described in detail with reference to the accompanying drawings. In the description of the drawings, the same components will be indicated by the same reference numerals and a redundant description thereof will be appropriately omitted.

Embodiments

FIG. 1 is a diagram schematically illustrating a configuration of a spectrometry device 1 of an embodiment. In FIG. 1, an integrating sphere 10 is illustrated as a cross-section (the same cross-section as that of FIG. 4). The spectrometry device 1 according to the embodiment includes an excitation light supply unit 3, a power source 4, an electric detector 5, a data processing unit 6, the integrating sphere 10, and a spectral detector 60 and is used to spectroscopically detect measurement target light emitted from a sample 2 which is a sample to be measured. Further, the spectrometry device 1 according to the embodiment detects a photovoltaic current generated from the sample 2 in accordance with the irradiation of the excitation light. The measurement target light is, for example, light which is generated from the sample 2 in accordance with the irradiation of the excitation light to the sample 2, light which is not absorbed to the sample 2 in the excitation light irradiating the sample 2, light which is generated from the sample 2 in accordance with the supply of a current or a voltage to the sample 2, or a combination of these lights.

The excitation light supply unit 3 allows the sample 2 corresponding to the measurement target to be irradiated with the excitation light for measuring the light emission characteristics of the sample 2. In a configuration example illustrated in FIG. 1, the excitation light supply unit 3 includes an excitation light source 3a and a light guide 3b which guides light supplied from the excitation light source 3a to the integrating sphere 10. The light guide 3b is attached to an attachment hole 12 of the integrating sphere 10.

The spectral detector 60 detects the measurement target light output from the integrating sphere 10. Specifically, the spectral detector 60 detects multiple measurement target lights reflected by an inner wall surface 10a of the integrating sphere 10, detects a wavelength component of the measurement target light, and outputs a detection signal related to the light intensity for each wavelength of the measurement target light. The spectral detector 60 is connected to the data processing unit 6 and outputs the detection signal to the data processing unit 6.

The power source 4 is electrically connected to the sample 2 through a sample attachment portion 20 and supplies a current to the sample 2.

The electric detector 5 is electrically connected to the sample 2 through the sample attachment portion 20, detects, for example, at least one of a current and a voltage generated in the sample 2 in accordance with the irradiation of the excitation light from the excitation light supply unit 3, and outputs a detection signal. The electric detector 5 is connected to the data processing unit 6 and outputs the detection signal to the data processing unit 6.

The data processing unit 6 is, for example, a personal computer, a smart device, a cloud server, or the like and is electrically connected to the excitation light source 3a, the spectral detector 60, the power source 4, and the electric detector 5. The data processing unit 6 calculates, for example, characteristics of the sample 2 such as quantum efficiency on the basis of the detection signal output from the spectral detector 60. Further, the data processing unit 6 calculates, for example, characteristics of the sample 2 such as a photovoltaic current and/or internal quantum efficiency on the basis of the detection signal output from the electric detector 5. Further, the data processing unit 6 controls the excitation light source 3a, the spectral detector 60, the power source 4, and the electric detector 5. The connection between the data processing unit 6 and the other components is not limited to a wired connection, but may be a wireless connection. The connection may be performed by a network communication.

Figure 2:
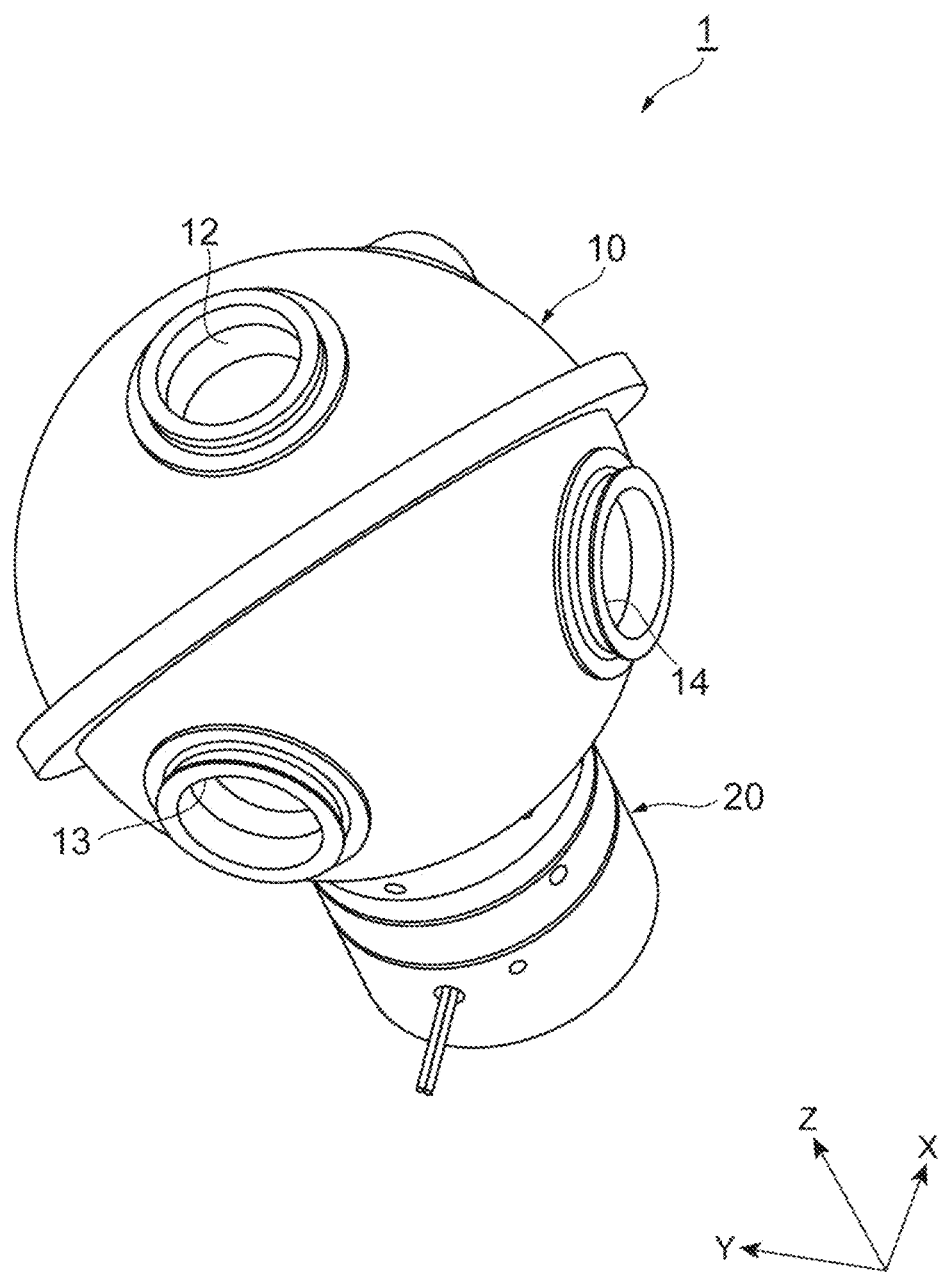
FIG. 2 is a perspective view of the spectrometry device illustrated in FIG. 1.
Figure 3:
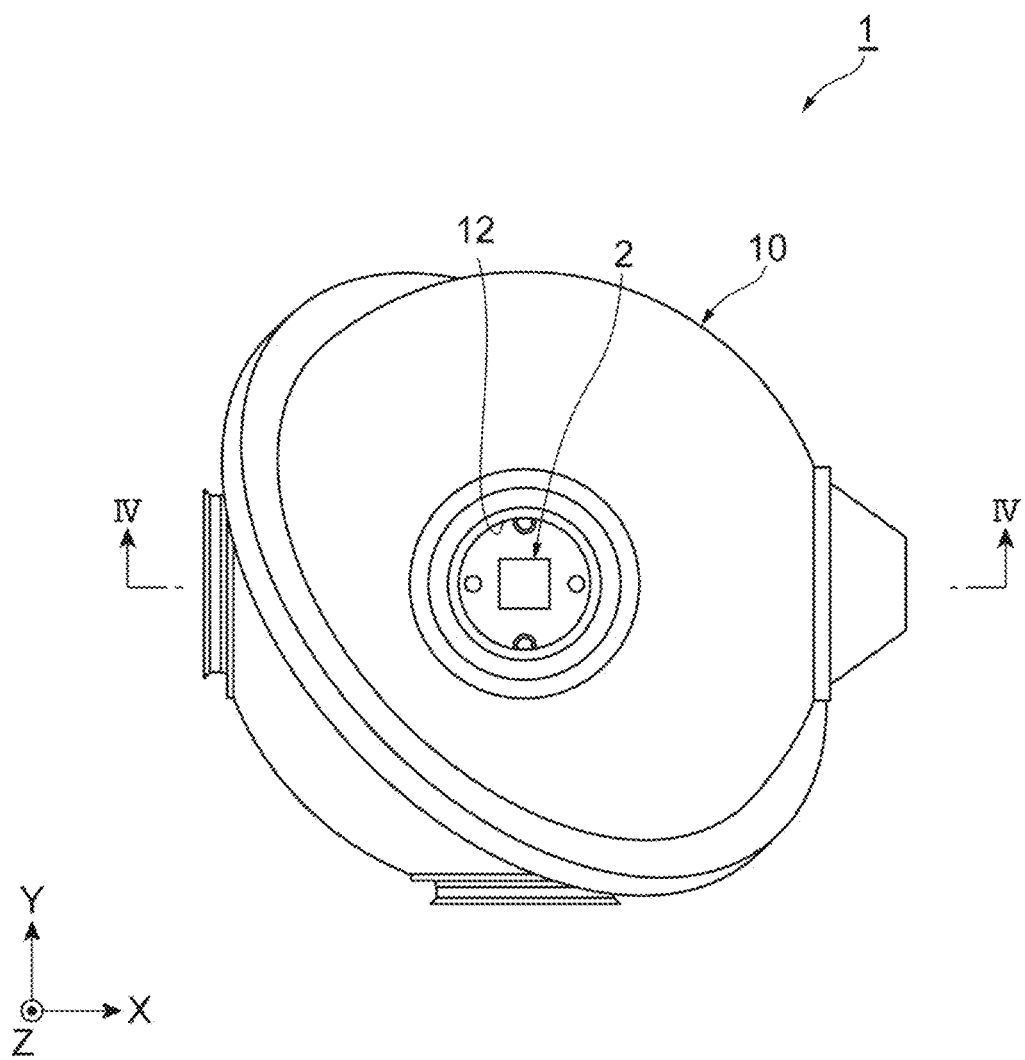
FIG. 3 is a top view of the spectrometry device illustrated in FIG. 1.
Figure 4:
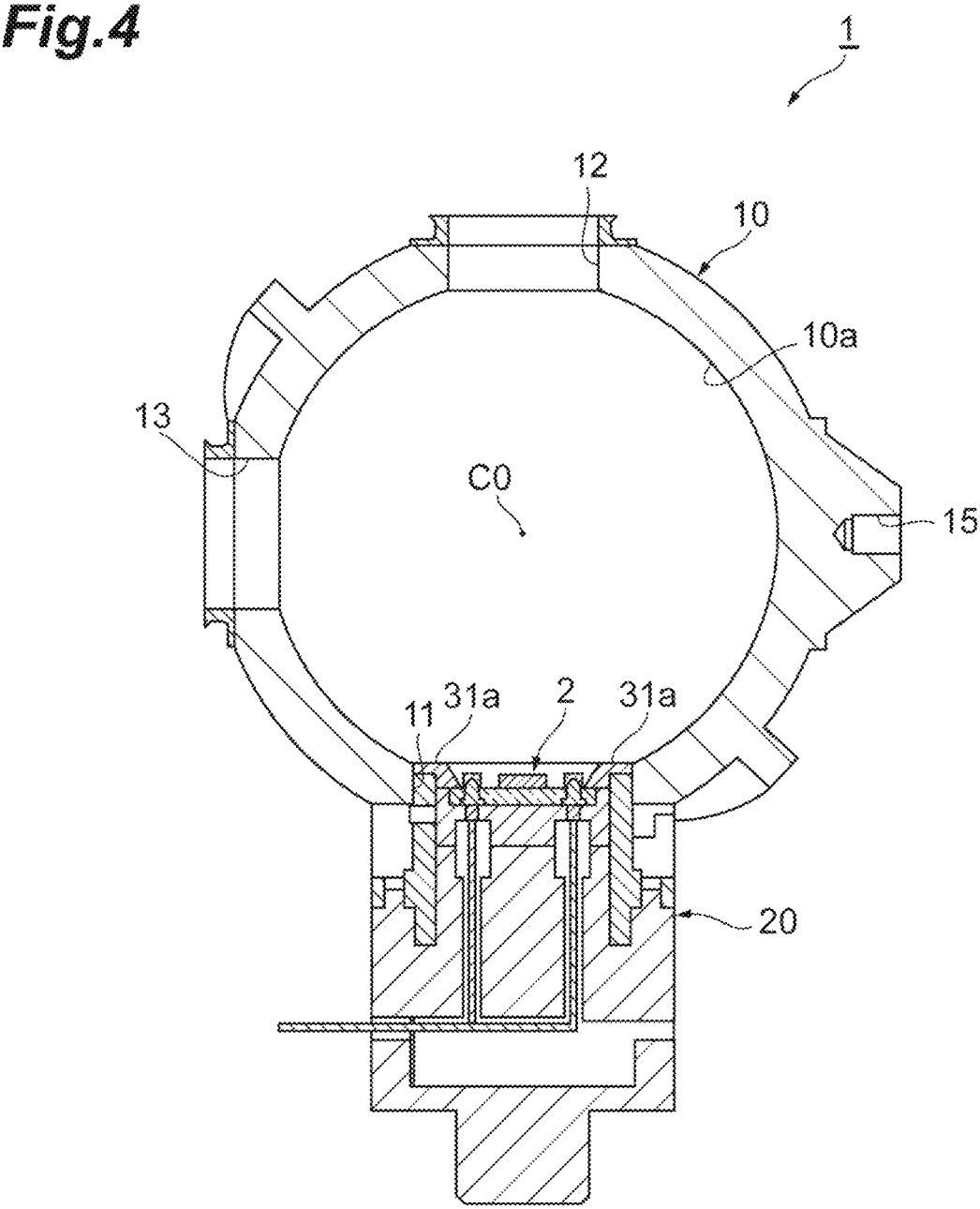
FIG. 4 is a cross-sectional view taken along a line IV-IV illustrated in FIG. 3.

FIG. 2 is a perspective view of the spectrometry device 1. FIG. 3 is a top view of the spectrometry device 1. FIG. 4 is a cross-sectional view taken along a line IV-IV illustrated in FIG. 3. In the drawings, an XYZ coordinate system is illustrated in order to help the understanding. The spectrometry device 1 is used to measure characteristics of the sample 2 such as quantum efficiency according to an EL method and/or a PL method by spectroscopically detecting the measurement target light. The sample 2 is, for example, an inorganic light emitting element such as a Light Emitting Diode (LED). As illustrated in FIGS. 2, 3, and 4, the spectrometry device 1 includes the integrating sphere 10, the sample attachment portion 20, and the spectral detector 60.

The integrating sphere 10 includes the inner wall surface 10a which reflects the measurement target light. The inner wall surface 10a is coated with, for example, a high diffuse reflector such as barium sulfate or is formed of, for example, a high diffuse reflective material such as Spectralon (registered trademark). The integrating sphere 10 further includes attachment holes 11, 12, and 13, a spare hole 14, and an attachment screw hole 15. Each of the attachment holes 11, 12, and 13 extends outward from the inner wall surface 10a of the integrating sphere 10.

The attachment hole 11 is a hole for attaching the sample attachment portion 20. The attachment hole 11 is provided in one end portion of the integrating sphere 10 in the Z direction. The attachment hole 12 is a hole for attaching the excitation light supply unit 3. The attachment hole 12 is provided in the other end portion of the integrating sphere 10 in the Z direction. That is, the attachment hole 12 is located on the opposite side with respect to the attachment hole 11 with a center portion C0 of the integrating sphere 10 interposed therebetween. The attachment hole 13 is a hole for attaching the spectral detector 60. The attachment hole 13 is provided in one end portion of the integrating sphere 10 in the X direction. As an example, the attachment hole 13 is provided at a position separated from the attachment hole 11 and the attachment hole 12 by the same distance. The spare hole 14 is provided in one end portion of the integrating sphere 10 in the Y direction. As an example, the spare hole 14 is provided at a position separated from the attachment hole 11, the attachment hole 12, and the attachment hole 13 by the same distance. The spare hole 14 is closed with, for example, a plug (not illustrated). A portion which is exposed into the integrating sphere 10 in the plug forms a continuous surface with the inner wall surface 10a of the integrating sphere 10. The portion of the plug is coated with the same high diffuse reflector as the inner wall surface 10a or is formed of the same high diffuse reflective material as the inner wall surface 10a. The attachment screw hole 15 is a hole for attaching the integrating sphere 10 to, for example, a mounting plate (not illustrated) by an attachment screw (not illustrated). The attachment screw hole 15 is provided in the other end portion of the integrating sphere 10 in the X direction. That is, the attachment screw hole 15 is located on the opposite side with respect to the attachment hole 13 with the center portion C0 of the integrating sphere 10 interposed therebetween.

Figure 5:
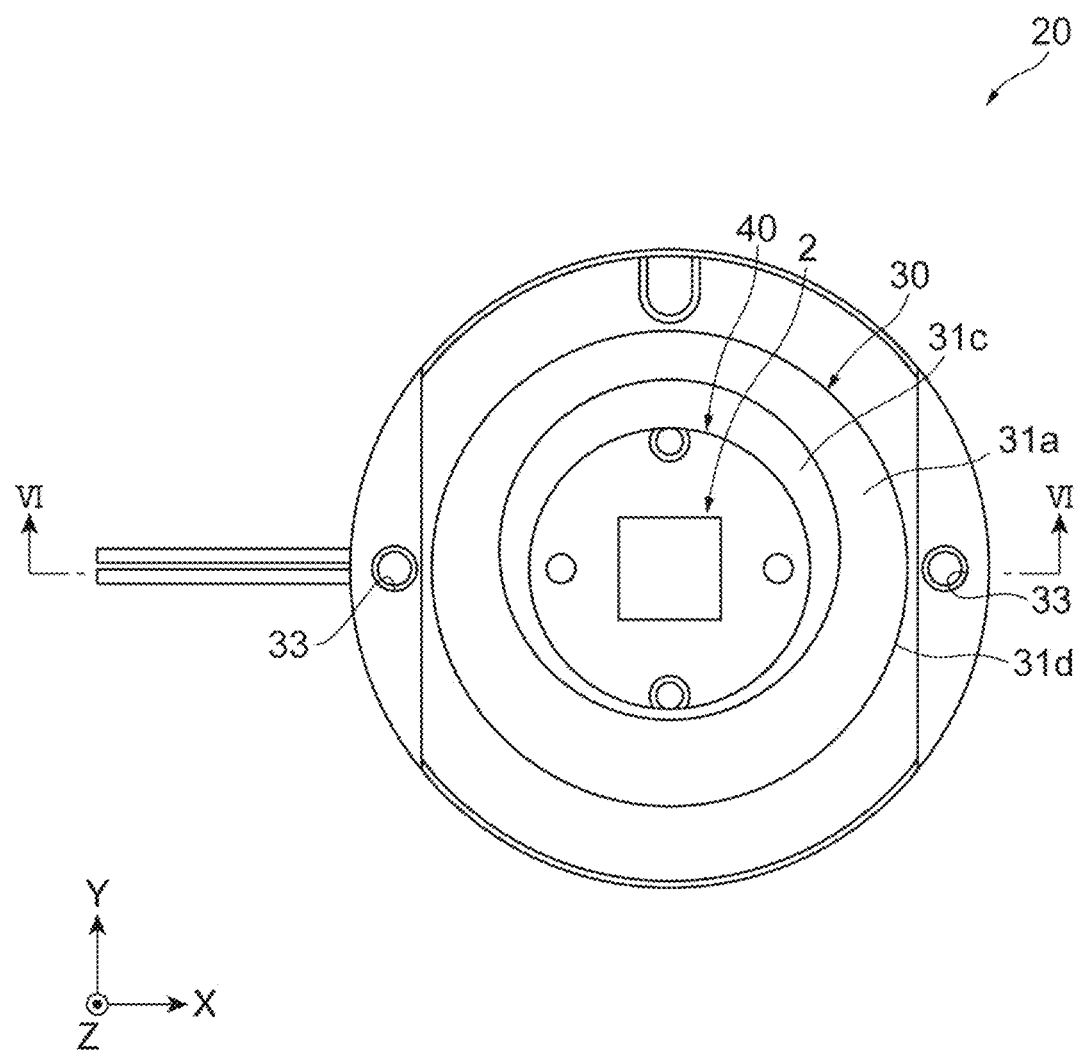
FIG. 5 is a top view of a sample attachment portion.
Figure 6:
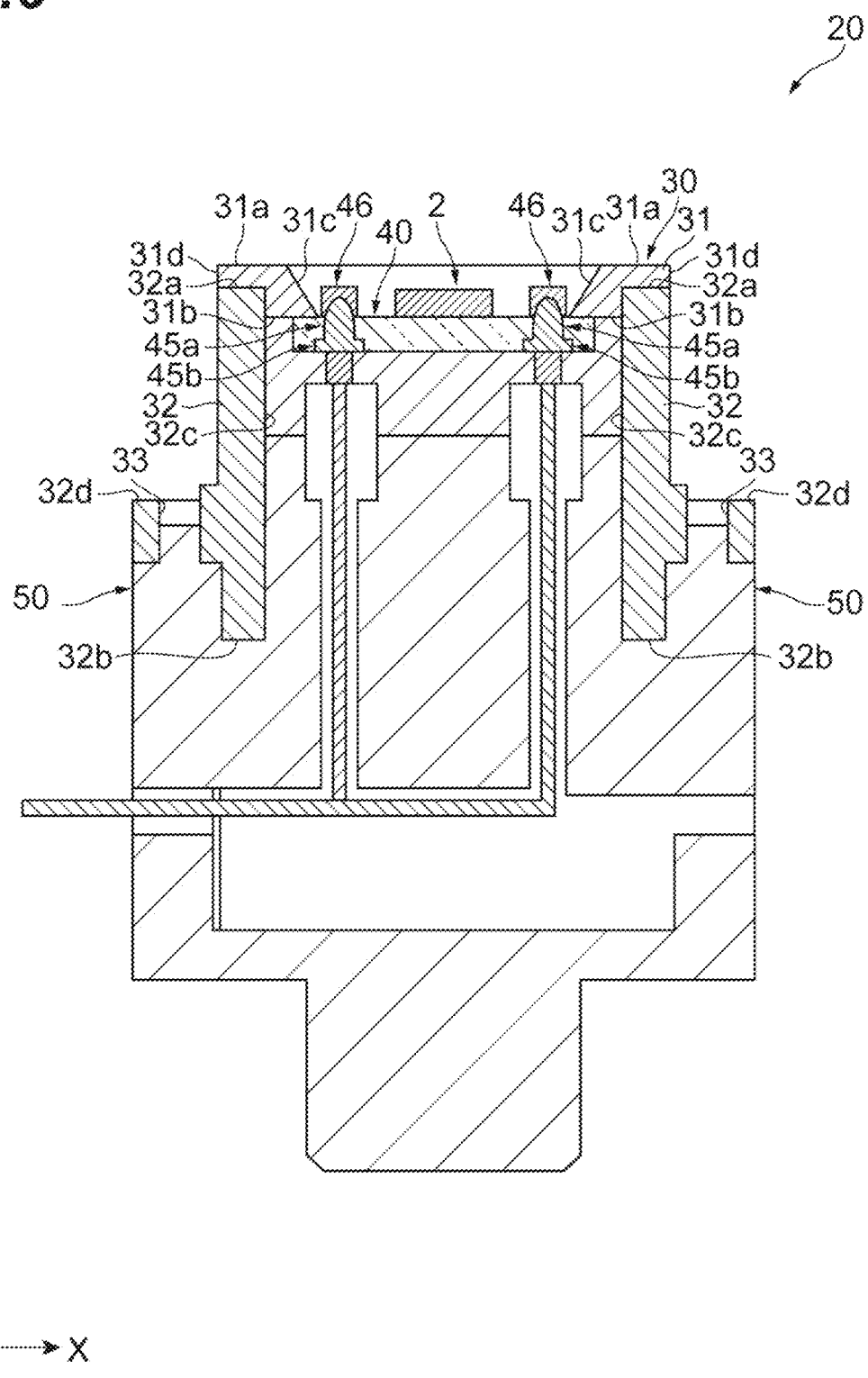
FIG. 6 is a cross-sectional view taken along a line VI-VI illustrated in FIG. 5.

FIG. 5 is a top view of the sample attachment portion 20. FIG. 6 is a cross-sectional view taken along a line VI-VI illustrated in FIG. 5. The sample attachment portion 20 has a columnar shape in which the Z direction is the center axis direction. The sample attachment portion 20 includes, as illustrated in FIGS. 5 and 6, an adapter 30, a holder cover 32, a plate 40, and a holder 50. The adapter 30 is a cylindrical component in which the Z direction is the center axis direction. The adapter 30 is disposed in the attachment hole 11. Specifically, the adapter 30 is accommodated inside the attachment hole 11 so that the center axis passes through the center portion C0 of the integrating sphere 10. The adapter 30 includes, as illustrated in FIG. 6, end surfaces 31a and 31b which face each other in the Z direction, a guide hole 31c which penetrates from the end surface 31a to the end surface 31b, and a flange portion 31d which is provided on the side of the end surface 31a in the Z direction. The end surface 31b is a pressing portion of the embodiment.

The end surface 31a is disposed, as illustrated in FIG. 4, at a position continuous to the inner wall surface 10a of the integrating sphere 10. The guide hole 31c extends along the attachment hole 11 so that a center axis of guide hole 31c is inclined with respect to a line passing through the center portion C0 of the integrating sphere 10. In other words, the guide hole 31c has an asymmetrical shape with respect to the line passing through the center portion C0 (for example, see FIG. 5). This is to prevent the excitation light incident from an inclination direction from being blocked by the adapter 30. The guide hole 31c is coated with a reflective material reflecting the measurement target light and guides the measurement target light so that the measurement target light is multiply reflected inside the integrating sphere 10. The guide hole 31c is coated with the same high diffuse reflector as the inner wall surface 10a or is formed of the same high diffuse reflective material as the inner wall surface 10a. The guide hole 31c has a tapered shape which gradually increases in diameter toward the center portion C0 of the integrating sphere 10. The flange portion 31d is provided, as illustrated in FIG. 6, along the outer peripheral surface of the adapter 30.

The holder cover 32 is, as illustrated in FIG. 6, a cylindrical component in which the Z direction is the center axis direction. The holder cover 32 is provided on the side opposite to the center portion C0 in the Z direction with respect to the adapter 30. One end portion of the holder cover 32 is inserted into the attachment hole 11 along with the adapter 30 (see FIG. 4). The holder cover 32 includes, as illustrated in FIG. 6, end surfaces 32a and 32b which face each other in the Z direction, a through-hole 32c which extends from the end surface 32a to the end surface 32b, and a flange portion 32d which is provided on the side of the end surface 32b in the Z direction. The end surface 32a comes into contact with a surface on the side of the end surface 31b of the flange portion 31d inside the attachment hole 11. A portion excluding the flange portion 31d of the adapter 30 is inserted into one end portion on the side of the center portion C0 in the Z direction of the through-hole 32c. The inner diameter of the through-hole 32c is equal to or slightly smaller than the outer diameter of the portion of the adapter 30. The flange portion 32d is provided along the outer peripheral surface of the holder cover 32. The outer diameter of the flange portion 32d is larger than the inner diameter of the attachment hole 11. The flange portion 32d includes a pair of positioning holes 33 which extends in the Z direction. The pair of positioning holes 33 is provided side by side with the through-hole 32c interposed therebetween in the X direction.

Figure 7:
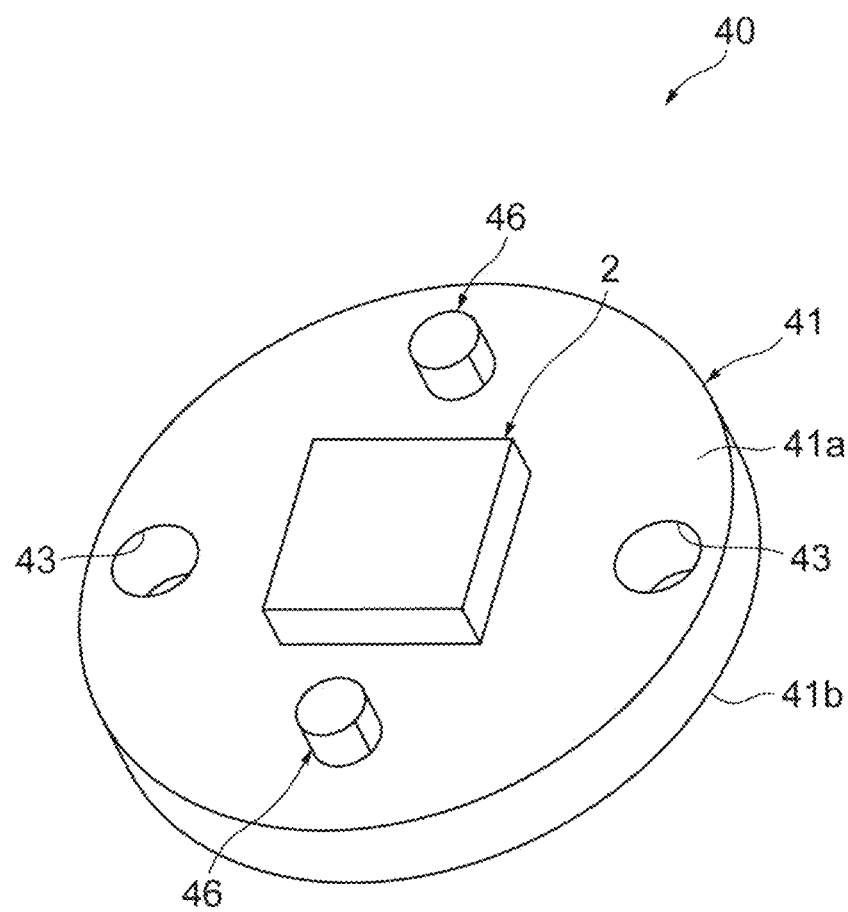
FIG. 7 is a perspective view illustrating a plate from an oblique upper side.

The plate 40 is provided, as illustrated in FIG. 6, inside the through-hole 32c of the holder cover 32. FIG. 7 is a perspective view illustrating the plate 40 from an oblique upper side. FIG. 8 is a perspective view illustrating the plate 40 from an oblique lower side. The plate 40 includes, as illustrated in FIGS. 7 and 8, a transparent substrate 41, a pair of metal pins 45, and a pair of electrodes 46. The pair of electrodes 46 is first electrodes of the embodiment. The transparent substrate 41 is formed of, for example, a transparent material such as quartz glass or synthetic quartz glass and allows the measurement target light emitted from the sample 2 to be transmitted therethrough. The transparent substrate 41 has a cylindrical shape when viewed from the Z direction. The transparent substrate 41 includes a first surface 41a which intersects the Z direction, a second surface 41b which is disposed on the side opposite to the first surface 41a, and a pair of positioning holes 43 which penetrates from the first surface 41a to the second surface 41b.

The sample 2 is mounted on the first surface 41a. As an example, the sample 2 is disposed at a center position of the first surface 41a. The first surface 41a and the sample 2 are fixed to each other by, for example, grease. The first surface 41a covers an opening on the side of the end surface 31b of the guide hole 31c (that is, the outside of the integrating sphere 10) and comes into contact with the end surface 31b of the adapter 30. The pair of positioning holes 43 is respectively provided, as illustrated in FIGS. 7 and 8, at symmetrical positions with the center position of the transparent substrate 41 in the Y direction interposed therebetween.

Figure 9:
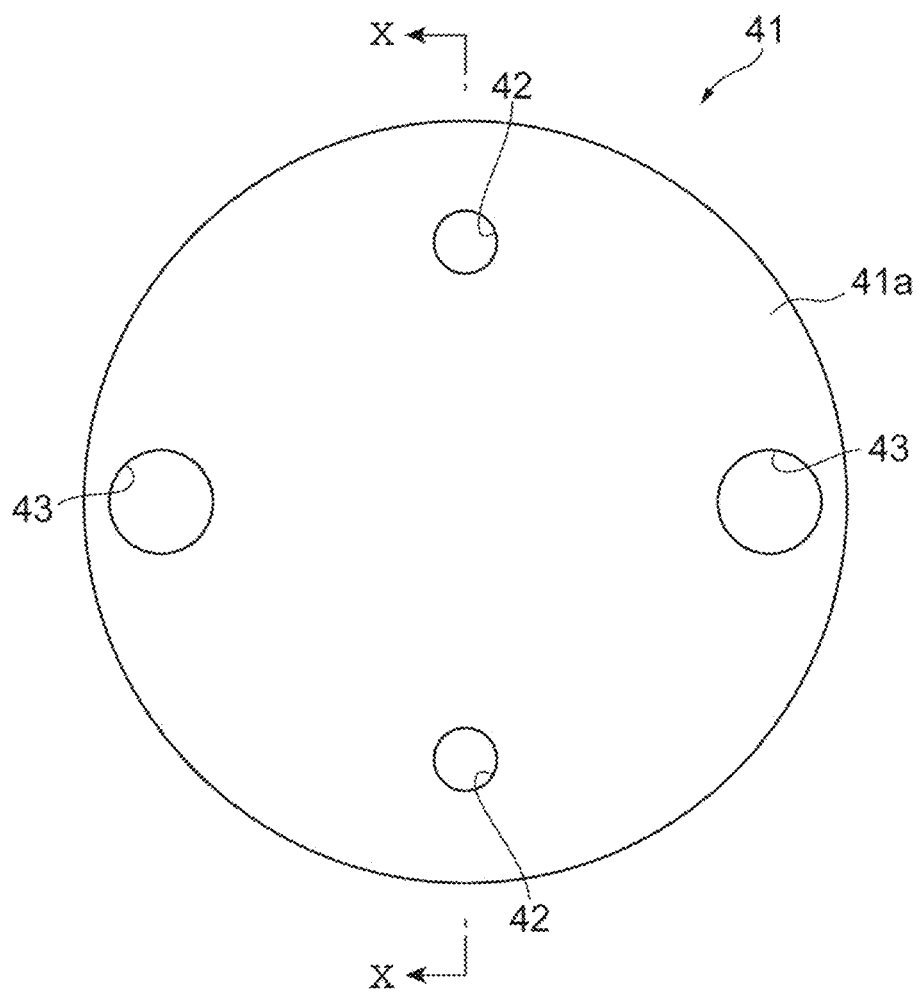
FIG. 9 is a front view illustrating a first surface of a transparent substrate.
Figure 10:
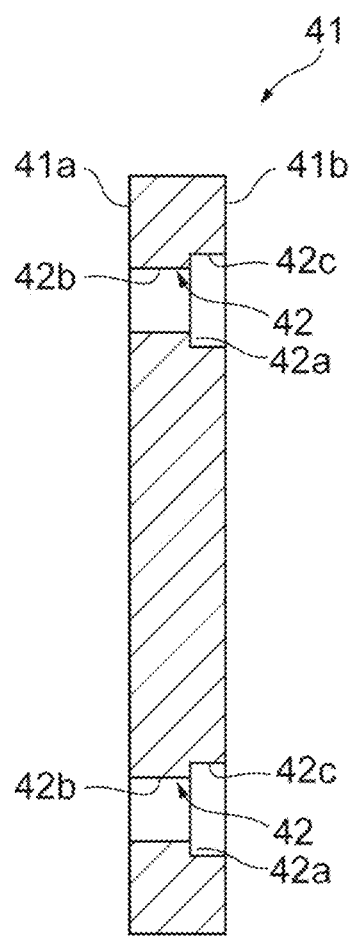
FIG. 10 is a cross-sectional view taken along a line X-X illustrated in FIG. 9.
Figure 11:
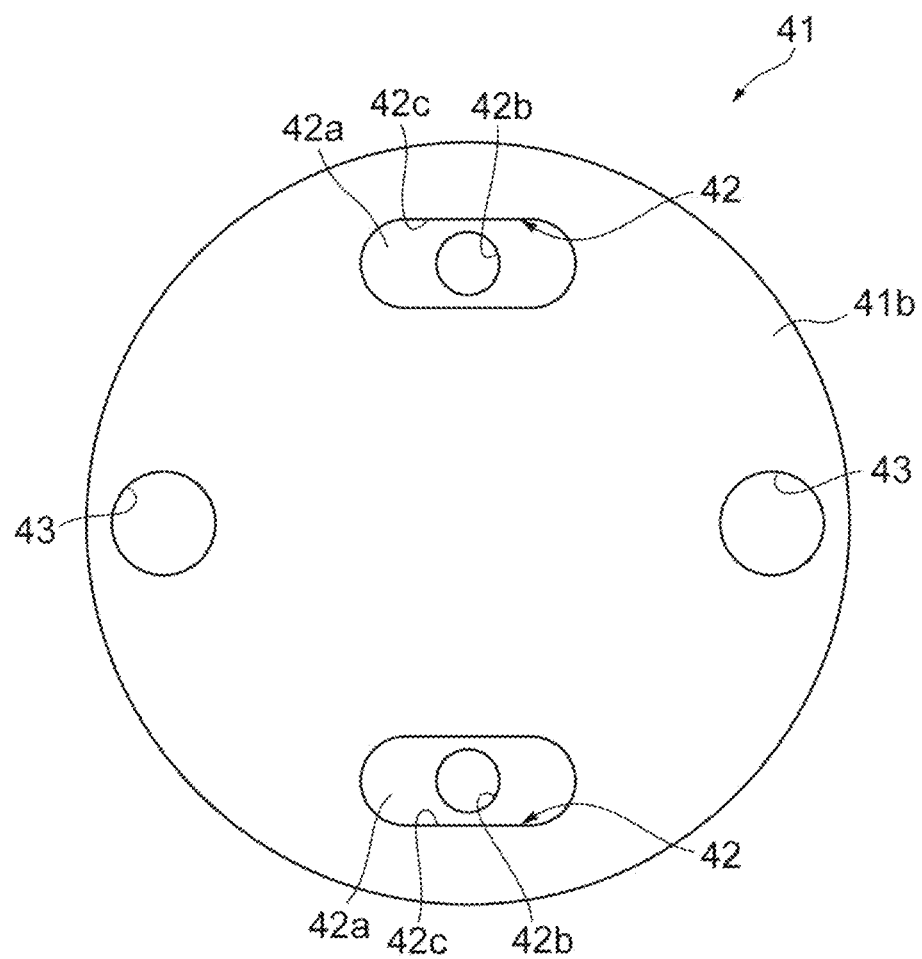
FIG. 11 is a rear view illustrating a second surface of the transparent substrate.

FIG. 9 is a front view illustrating the first surface 41a of the transparent substrate 41. FIG. 10 is a cross-sectional view taken along a line X-X illustrated in FIG. 9. FIG. 11 is a rear view illustrating the second surface 41b of the transparent substrate 41. As illustrated in FIGS. 9, 10, and 11, the transparent substrate 41 further includes a pair of electrode holes 42 which penetrates from the first surface 41a to the second surface 41b. The pair of electrode holes 42 is through-holes of the embodiment. The pair of electrode holes 42 is respectively provided at symmetrical positions with the center position of the transparent substrate 41 in the X direction interposed therebetween. The pair of electrode holes 42 includes, as illustrated in FIGS. 10 and 11, step surfaces 42a which intersect the Z direction, respectively. The step surface 42a is disposed between the first surface 41a and the second surface 41b. The pair of electrode holes 42 further includes, as illustrated in FIGS. 10 and 11, a first hole portion 42b which extends from the first surface 41a to the step surface 42a and a second hole portion 42c which extends from the step surface 42a to the second surface 41b. The first hole portion 42b has a circular shape when viewed from the Z direction. The first hole portion 42b is connected to the second hole portion 42c through the step surface 42a. The second hole portion 42c has an oval shape in which the Y direction is a long axis when viewed from the Z direction. The minimum value of the inner diameter of the second hole portion 42c is larger than the inner diameter of the first hole portion 42b.

Again, FIGS. 7 and 8 will be referred. The pair of metal pins 45 has a stepped cylindrical shape in which the Z direction is the center axis direction. The pair of metal pins 45 is respectively inserted into the pair of electrode holes 42. The pair of metal pins 45 includes a first column 45a (see FIG. 6) and a second column 45b (see FIGS. 6 and 8) which are connected to each other through a step surface (not illustrated). The first column 45a and the second column 45b are first conductors of the embodiment and a bottom surface of the second column 45*b* is a second electrode of the embodiment. The first column 45*a* and the second column 45*b* are connected to each other and are electrically connected to each other. The step surfaces of the pair of metal pins 45 intersect the Z direction and respectively come into contact with the step surfaces 42*a* of the pair of electrode holes 42. The first column 45*a* has a circular shape when viewed from the Z direction. The first column 45*a* is provided inside the first hole portion 42*b*. Specifically, the first column 45*a* is inserted into the first hole portion 42*b*. As an example, the outer diameter of the first column 45*a* is equal to or slightly smaller than the inner diameter of the first hole portion 42*b*. One end portion on the side of the center portion C0 in the Z direction of the first column 45*a* protrudes from the first surface 41*a*.

The second column 45*b* has, as illustrated in FIG. 8, an oval shape when viewed from the Z direction. The second column 45*b* is inserted into the second hole portion 42*c*. The outer shape of the second column 45*b* is formed along the inner shape of the second hole portion 42*c*. The length of the short axis of the second column 45*b* is equal to the length of the short axis of the second hole portion 42*c* and the length of the long axis of the second column 45*b* is slightly smaller than the length of the long axis of the second hole portion 42*c*. The bottom surface of the second column 45*b* is exposed to the second surface 41*b*. The pair of electrodes 46 is exposed to the first surface 41*a* as illustrated in FIG. 7. Specifically, the pair of electrodes 46 is provided on the first surface 41*a* and respectively covers one end portions protruding from the first surfaces 41*a* of the first columns 45*a* of the pair of metal pins 45. The pair of electrodes 46 is respectively electrically connected to the pair of first columns 45*a*. Further, the pair of electrodes 46 is electrically connected to the pair of electrodes of the sample 2 through a bonding wire (not illustrated).

Figure 12:
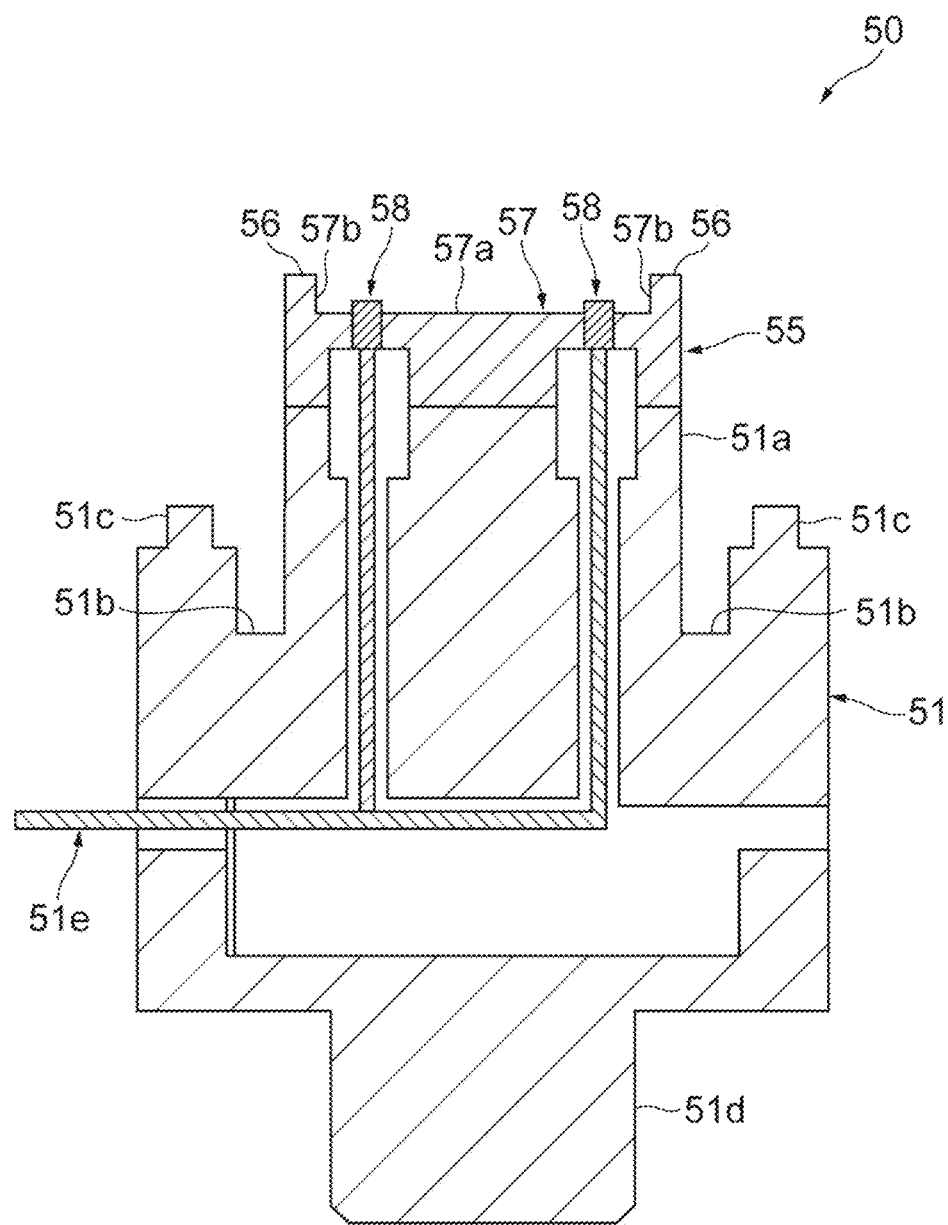
FIG. 12 is a cross-sectional view illustrating a configuration of a holder illustrated in FIG. 6.

FIG. 12 is a cross-sectional view illustrating a configuration of the holder 50 illustrated in FIG. 6. The holder 50 is attached to the integrating sphere 10 along with the adapter 30 and the holder cover 32. The holder 50 includes, as illustrated in FIG. 12, a main body 51 and a mounting portion 55. The main body 51 has a columnar shape in which the Z direction is the center axis direction. The main body 51 includes an attachment portion 51*a*, a groove portion 51*b*, a pair of positioning pins 51*c*, a small diameter portion 51*d*, and a wiring 51*e*. The attachment portion 51*a* has a columnar shape in which the center axis of the main body 51 is a center axis and is provided in one end on the side of the center portion C0 in the Z direction of the main body 51. The attachment portion 51*a* is inserted into the through-hole 32*c* of the holder cover 32 (see FIG. 6). As an example, the outer diameter of the attachment portion 51*a* is equal to or slightly smaller than the inner diameter of the through-hole 32*c*. Meanwhile, the outer diameter of the attachment portion 51*a* is smaller than a maximum value of the outer diameter of the main body 51. The mounting portion 55 is attached onto the attachment portion 51*a*. The groove portion 51*b* extends in a circumferential direction such that the Z direction is a depth direction and is provided in one end of the main body 51. The groove portion 51*b* is formed along the outer periphery of the attachment portion 51*a*. The other end portion on the side of the end surface 32*b* of the holder cover 32 is fitted to the groove portion 51*b*.

The pair of positioning pins 51*c* is provided in one end of the main body 51 and is formed on the outside in the radial direction of the main body 51 with respect to the groove portion 51*b*. The pair of positioning pins 51*c* extends in the Z direction and are disposed side by side with the attachment portion 51*a* interposed therebetween in the X direction. The pair of positioning pins 51*c* is respectively provided at positions corresponding to the pair of positioning holes 33 of the flange portion 32*d* of the holder cover 32. The pair of positioning pins 51*c* is respectively inserted into the pair of positioning holes 33. The outer diameters of the pair of positioning pins 51*c* are respectively equal to or slightly smaller than the inner diameters of the pair of positioning holes 33. By the pair of positioning pins 51*c* and the pair of positioning holes 33, the adapter 30 is relatively positioned within the XY plane with respect to the holder 50 through the holder cover 32. The small diameter portion 51*d* is provided in the other end of the main body 51 in the Z direction. The small diameter portion 51*d* is formed in a columnar shape in which the center axis of the main body 51 is a center axis and the outer diameter of the small diameter portion 51*d* is smaller than a maximum value of the outer diameter of the main body 51.

The mounting portion 55 has a columnar shape in which the center axis of the main body 51 is a center axis. The mounting portion 55 is inserted into the through-hole 32*c* of the holder cover 32 (see FIG. 6). The outer diameter of the mounting portion 55 is equal to, as illustrated in FIG. 12, the outer diameter of the attachment portion 51*a*. FIG. 13 is a perspective view of the mounting portion 55. The mounting portion 55 includes, as illustrated in FIGS. 12 and 13, an end surface 56 which is provided on the side of the center portion C0 of the integrating sphere 10 in the Z direction, a concave portion 57 which is recessed from the end surface 56 in the Z direction, and a pair of terminals 58 which extends in the Z direction. The pair of terminals 58 is second conductors of the embodiment. The end surface 56 comes into contact with the end surface 31*b* of the adapter 30 inside the through-hole 32*c* (see FIG. 6). The plate 40 is accommodated in the concave portion 57. The concave portion 57 includes a bottom surface 57*a* which intersects the Z direction, a side surface 57*b* which intersects the XY plane, a pair of electrode holes 57*c* which extends from the bottom surface 57*a* in the Z direction, and a pair of positioning pins 57*d* which is provided in the bottom surface 57*a*. The pair of electrode holes 57*c* is hole portions of the embodiment. The bottom surface 57*a* and the side surface 57*b* are coated with a reflective material reflecting the measurement target light. That is, the bottom surface 57*a* and the side surface 57*b* are coated with the same high diffuse reflector as the inner wall surface 10*a* or are formed of the same high diffuse reflective material as the inner wall surface 10*a*.

The bottom surface 57*a* has a circular shape when viewed from the Z direction. The transparent substrate 41 is mounted on the bottom surface 57*a*. As an example, the outer diameter of the bottom surface 57*a* is slightly larger than the outer diameter of the transparent substrate 41. The bottom surface 57*a* faces the second surface 41*b* of the transparent substrate 41 in the Z direction. As an example, the bottom surface 57*a* comes into contact with the second surface 41*b*. The plate 40 is pressed against the bottom surface 57*a* by the end surface 31*b* of the adapter 30. Specifically, the first surface 41*a* is pressed against the end surface 31*b* so that the second surface 41*b* is pressed against the bottom surface 57*a*. The side surface 57*b* is raised from the bottom surface 57*a*. Specifically, the side surface 57*b* extends from the edge of the bottom surface 57*a* to the end surface 56 in the Z direction. As an example, the side surface 57*b* is perpendicular to the bottom surface 57*a* and the end surface 56. The side surface 57*b* surrounds the periphery of the transparent substrate 41 mounted on the bottom surface 57a. The side surface 57b is fitted to the transparent substrate 41. Accordingly, the side surface 57b defines a position of the transparent substrate 41 within the XY plane along the bottom surface 57a. The side surface 57b has a circular shape which is slightly larger than the outer shape of the transparent substrate 41 when viewed from the Z direction. The thickness of the transparent substrate 41 is equal to or smaller than the height of the side surface 57b from the bottom surface 57a. That is, the distance from the bottom surface 57a to the end surface 56 in the Z direction is equal to or longer than the distance from the first surface 41a to the second surface 41b of the transparent substrate 41 in the Z direction.

The pair of electrode holes 57c extends from the bottom surface 57a in the Z direction and is provided at symmetrical positions with the center position of the bottom surface 57a in the X direction interposed therebetween. The pair of electrode holes 57c is respectively provided at positions corresponding to the pair of electrode holes 42 of the transparent substrate 41. The pair of positioning pins 57d is provided, as illustrated in FIG. 13, at symmetrical positions with the center position of the bottom surface 57a in the Y direction interposed therebetween. The pair of positioning pins 57d is respectively provided at positions corresponding to the pair of positioning holes 43 of the transparent substrate 41. The pair of positioning pins 57d is respectively inserted into the pair of positioning holes 43. The outer diameters of the pair of positioning pins 57d are respectively equal to or slightly smaller than the inner diameters of the pair of positioning holes 43. By the pair of positioning pins 57d and the pair of positioning holes 43, the plate 40 is relatively positioned in the circumferential direction about the center with respect to the mounting portion 55.

The pair of terminals 58 extends in the Z direction and are respectively provided inside the pair of electrode holes 57c. Specifically, the pair of terminals 58 is respectively inserted into the pair of electrode holes 57c. The pair of terminals 58 receives a pressing force applied toward the center portion C0 in the Z direction by a spring (not illustrated) provided in the main body 51. The pair of terminals 58 is respectively electrically connected to the pair of second columns 45b in a contact state. The other end portions of the pair of terminals 58 are connected to, as illustrated in FIG. 12, one end of the wiring 51e inside the main body 51. The wiring 51e extends in the Z direction inside the main body 51. The other end of the wiring 51e extends from a outer surface on the side of the small diameter portion 51d in the Z direction of the main body 51 toward the outside of the main body 51. Here, when the quantum efficiency of the sample 2 is measured by the EL method, the other end of the wiring 51e is connected to the power source 4 and the electric detector 5 provided outside the main body 51. Accordingly, the pair of terminals 58 is respectively electrically connected to plus and minus poles of the power source 4 and the electric detector 5.

Next, a spectrometry method of measuring the quantum efficiency of the sample 2 by using the spectrometry device 1 of the embodiment will be described. The quantum efficiency of the sample 2 is measured by the spectral intensity of the measurement target light.

Figure 14:
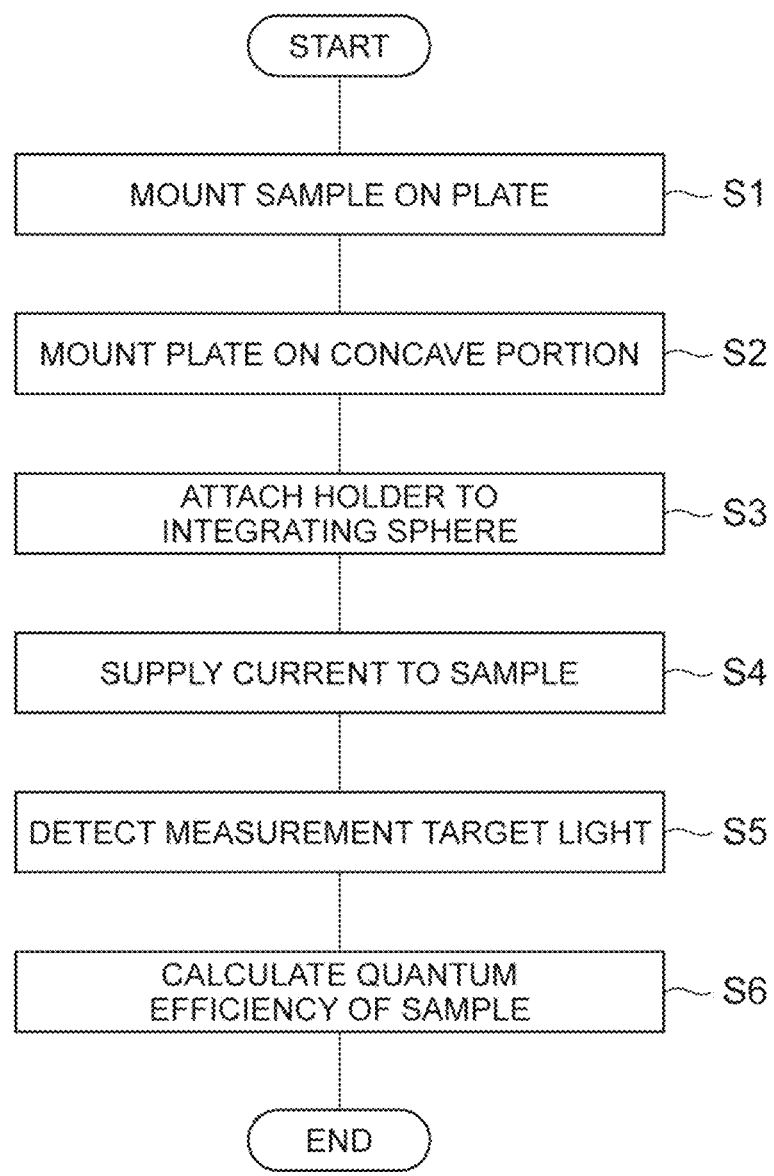
FIG. 14 is a flowchart illustrating an example of a spectrometry method of measuring quantum efficiency of a sample according to an EL method.

The quantum efficiency of the sample 2 is measured by, for example, the EL method. FIG. 14 is a flowchart illustrating an example of a spectrometry method of measuring the external quantum efficiency of the sample 2 by the EL method. First, the sample 2 is mounted on the plate 40 (step S1: a mounting step). Specifically, the sample 2 is mounted on the first surface 41a of the transparent substrate 41 of the plate 40 with a grease interposed therebetween. Then, a pair of electrodes of the sample 2 is wire-bonded to the pair of electrodes 46 of the plate 40. Next, the plate 40 is accommodated in the concave portion 57 of the mounting portion 55 of the holder 50 (step S2: an accommodating step). Specifically, the second surface 41b of the transparent substrate 41 is mounted on the bottom surface 57a of the concave portion 57. At this time, the positioning pin 57d of the concave portion 57 is inserted into the positioning hole 43 from the second surface 41b. The pair of second columns 45b of the plate 40 respectively contacts the pair of terminals 58 protruding from the bottom surface 57a of the concave portion 57.

Next, the adapter 30 is disposed on the plate 40 and the holder 50 is attached to the integrating sphere 10 (step S3: a disposing step). Specifically, a portion excluding the flange portion 31d of the adapter 30 is inserted into the pair of positioning holes 33 of the holder cover 32 and the flange portion 31d of the adapter 30 is brought into contact with the end surface 32a of the holder cover 32. Then, the pair of positioning pins 51c of the main body 51 is respectively inserted into the pair of positioning holes 33 of the holder cover 32 from the end surface 32b of the positioning hole 33. At this time, the end surface 31b of the adapter 30 is disposed on the first surface 41a of the transparent substrate 41 of the plate 40 so that the plate 40 is pressed against the bottom surface 57a by its own weight. Then, the opening on the side of the end surface 31b of the guide hole 31c is covered by the first surface 41a. Then, the mounting portion 55 of the holder 50 is inserted into the attachment hole 11 from the end surface 31a of the adapter 30 along with the adapter 30 and the holder cover 32, and the holder 50 is attached to the integrating sphere 10.

Next, the other end of the wiring 51e of the main body 51 of the holder 50 is connected to the power source 4. Then, a current is supplied to the sample 2 through the power source 4 so that light is emitted from the sample 2 (step S4: a light emitting step). This current is supplied to the sample 2 through the wiring 51e, the pair of terminals 58, and the pair of metal pins 45. When a current is supplied to the sample 2, the measurement target light is emitted from the sample 2. The measurement target light emitted from the sample 2 is guided into the integrating sphere 10 by the guide hole 31c of the adapter 30. Here, the measurement target light which is incident to the first surface 41a of the transparent substrate 41 is transmitted through the transparent substrate 41, is reflected by the bottom surface 57a and the side surface 57b of the concave portion 57 of the holder 50, and is again returned into the integrating sphere 10 so that the light is repeatedly reflected.

Then, the measurement target light is detected by the spectral detector 60 (step S5: a detecting step). The spectral detector 60 outputs a signal related to the light intensity for each wavelength of the measurement target light to the data processing unit 6. The data processing unit 6 calculates the spectral intensity of the measurement target light by performing data processing on the signal. Next, the data processing unit 6 calculates the external quantum efficiency of the sample 2 on the basis of the spectral intensity and a current value supplied to the sample 2 measured by the power source 4 (step S6: a calculating step). Specifically, the data processing unit 6 calculates the external quantum efficiency by using the following equation.

[Math. 1]

$$EQE_1 = \frac{PN_e}{e_1} \quad (1)$$

$EQE_1$ is the external quantum efficiency, PNe is the number of photons of the measurement target light, and $e_1$ is the number of electrons supplied to the sample 2. The number of photons PNe is calculated on the basis of the above-described spectral intensity and the number of electrons $e_1$ is calculated on the basis of the above-described current value. The external quantum efficiency $EQE_1$ and the internal quantum efficiency IQE have a relationship shown in the following equation.

[Math. 2]

$$EQE_1 = IQE \times LEE \times EIE \quad (2)$$

LEE is the light extraction efficiency and indicates a ratio of the light actually extracted out of the light generated in the sample 2. EIE is the electron injection efficiency and indicates a ratio of the charges injected into the light emitting layer of the sample 2 in the total charges. The light extraction efficiency LEE and the electron injection efficiency EIE are calculated, for example, by a known method.

Figure 15:
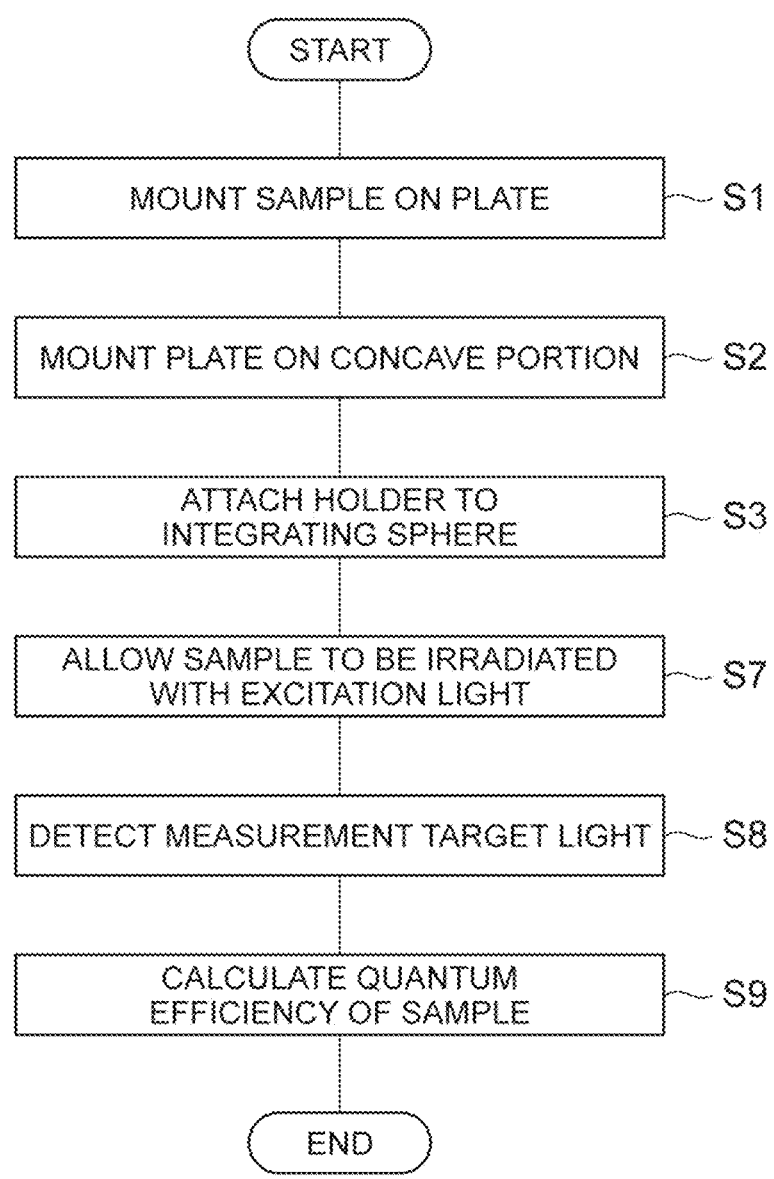
FIG. 15 is a flowchart illustrating an example of a spectrometry method of measuring quantum efficiency of a sample according to a PL method.

Next, a method of measuring the external quantum efficiency of the sample 2 by using the PL method will be described. FIG. 15 is a flowchart illustrating an example of a spectrometry method of measuring the external quantum efficiency of the sample 2 by the PL method. Since this method includes step S1 to step S3 in the method of calculating the external quantum efficiency of the sample 2 by using the EL method, a description from step S1 to step S3 will be omitted. In this method, the excitation light supply unit 3 is attached to the attachment hole 12 of the integrating sphere 10. Then, the sample 2 mounted on the first surface 41a within the integrating sphere 10 is directly irradiated with the excitation light from the excitation light source 3a of the excitation light supply unit 3 (step S7: an irradiating step). When the sample 2 is irradiated with the excitation light, the measurement target light is generated by a component of the excitation light not absorbed by the sample 2 and a component emitted from the sample 2 by absorbing the excitation light. As described above, the measurement target light is reflected by the guide hole 31c of the adapter 30 and is guided into the integrating sphere 10. Here, the measurement target light which is incident to the first surface 41a of the transparent substrate 41 is transmitted through the transparent substrate 41, is reflected by the bottom surface 57a and the side surface 57b of the concave portion 57 of the holder 50, and is again returned into the integrating sphere 10 so that the light is repeatedly reflected.

Next, the measurement target light is detected by the spectral detector 60 (step S8: a detecting step). The spectral detector 60 separates the measurement target light according to each wavelength component and outputs a signal related to the light intensity for each wavelength. Then, the spectral detector 60 outputs the signal to the data processing unit 6. The data processing unit 6 calculates the spectral intensity of the light emitted from the sample 2 and the spectral intensity of the excitation light by performing data processing on the signal. Next, the data processing unit 6 calculates the internal quantum efficiency of the sample 2 on the basis of the spectral intensities (step S9: a calculating step). Specifically, the data processing unit 6 calculates the internal quantum efficiency by using the following equation.

[Math. 3]

$$PLQE = \frac{PN_e}{PN_a} \quad (3)$$

PLQE is the internal quantum efficiency obtained by the PL method, PNe is the number of photons of light emitted from the sample 2, and PNa is the number of photons of the excitation light absorbed by the sample 2. The number of photons PNe is calculated on the basis of the spectral intensity of the light emitted from the sample 2 and the number of photons PNa is calculated on the basis of the spectral intensity of the excitation light. By using the internal quantum efficiency PLQE and the following relational equation, the external quantum efficiency can be also measured.

[Math. 4]

$$EQE_2 = PLQE \times LEE \quad (4)$$

$EQE_2$ is the external quantum efficiency. The light extraction efficiency LEE is calculated by a known method.

In the spectrometry device 1 and the spectrometry method of the embodiment, the internal quantum efficiency IQE of the sample 2 can be measured by measuring, for example, a photocurrent (light absorption current). In the method of measuring the photocurrent, the sample 2 within the integrating sphere 10 is irradiated with the excitation light from the excitation light supply unit 3. The data processing unit 6 calculates the number of photons PNa of the excitation light absorbed by the sample 2 as described above. The electric detector 5 measures at least one of a charge, a current, and a voltage extracted from the sample 2 and outputs a detection signal. Then, the data processing unit 6 calculates a photocurrent by using the following equation. Since the photocurrent calculated in this way is proportional to the internal quantum efficiency IQE of the sample 2, it is possible to obtain the internal quantum yield of the sample 2 by measuring the photocurrent generated by the irradiation of the excitation light with respect to the sample 2.

[Math. 5]

$$P = \frac{e_2}{PN_a} \quad (5)$$

P is a photocurrent and $e_2$ is the amount of charge that can be extracted from the sample 2.

Next, an effect obtained by the spectrometry device 1 and the spectrometry method of the embodiment will be described. In the spectrometry device 1 and the spectrometry method of the embodiment, since the concave portion 57 inside the integrating sphere 10 is coated with the reflective material reflecting the measurement target light, it is possible to make a situation in which the sample 2 is disposed in the integrating sphere 10 in a pseudo manner. That is, it is possible to suppress the measurement target light from being absorbed in the integrating sphere 10. Further, since the sample 2 is separated from the bottom surface 57a and the side surface 57b of the concave portion 57 with the transparent substrate 41 interposed therebetween and the sample 2 does not directly contact the bottom surface 57a and the side surface 57b coated with the reflective material, it is possible to prevent the bottom surface 57a and the side surface 57b from being scratched or contaminated by the sample 2. Accordingly, it is possible to further suppress a decrease in reflectance of the measurement target light in the bottom surface 57a and the side surface 57b. That is, it is possible to suppress the measurement target light from being absorbed in the integrating sphere 10. Thus, it is possible to highly accurately measure the light emission characteristics such as the internal quantum efficiency and/or the external quantum efficiency of the sample 2. The present inventor has found that the internal quantum efficiency and the external quantum efficiency of the sample 2 cannot be measured with high accuracy when the measurement target light is measured similarly while the sample 2 is directly mounted on a surface coated with the reflective material.

In the PL method, it is desirable to dispose the sample 2 to be exposed into the integrating sphere 10 in order to allow the sample 2 to be directly irradiated with the excitation light in general. This is because, for example, photons not discharged from the sample 2 to the outside are generated by the full reflection on the interface between the sample 2 and a transparent substrate and the measurement accuracy of the quantum efficiency of the sample 2 decreases when the sample 2 is disposed in a region other than the integrating sphere 10 and the sample 2 is irradiated with the excitation light through the transparent substrate. Meanwhile, in the EL method, for example, a cable is generally connected to the sample 2. Accordingly, it is desirable to dispose the sample 2 to be exposed to the outside of the integrating sphere 10 so that the cable is not exposed into the integrating sphere 10. This is because the external quantum efficiency or the internal quantum efficiency of the sample 2 is difficult to be measured with high accuracy since the cable absorbs the measurement target light when the cable formed of a material different from the material of the inner wall surface 10a of the integrating sphere 10 is exposed into the integrating sphere 10. In this way, the sample 2 is disposed in a different manner in the PL method and the EL method. However, it is troublesome to change the arrangement of the sample 2 in the PL method and the EL method. Further, when the measurement target light is measured by changing the arrangement of the sample 2 in this way, there is concern that a variation in measurement result may occur.

In contrast, in the spectrometry device 1 and the spectrometry method of the embodiment, since the sample 2 is exposed into the integrating sphere 10, the excitation light can be directly irradiated thereto. Further, it is possible to extremely decrease a portion that absorbs the measurement target light within the integrating sphere 10 by supplying a current to the sample 2 through the metal pin 45 of the plate 40. Thus, according to the spectrometry device 1 and the spectrometry method of the embodiment, it is possible to perform a measurement according to both of the PL method and the EL method without changing the arrangement of the sample 2. Further, since the configuration of the holder is generally different due to a difference in arrangement of the sample 2 in the PL method and the EL method, different holders are used properly. In contrast, in the spectrometry device 1 and the spectrometry method of the embodiment, since the same holder 50 can be used in the PL method and the EL method, this is versatile. Further, it is also possible to save the trouble of calibrating each holder 50.

The plate 40 is fitted to the side surface 57b. Further, in the accommodating step S2, the plate 40 is accommodated in the concave portion 57 so that the plate 40 is fitted to the side surface 57b. Accordingly, it is possible to easily perform a relative positioning operation of the plate 40 with respect to the holder 50.

The pair of electrodes 46 is electrically connected to the second column 45b. Accordingly, since it is possible to supply at least one of a current and a voltage to the sample 2 on the first surface 41a through the pair of electrodes 46 and the second column 45b, it is possible to appropriately measure the quantum efficiency according to the EL method.

The first column 45a provided inside the electrode hole 42 electrically connects the pair of electrodes 46 and the second column 45b to each other. When a current is supplied to the pair of electrodes 46 through the first column 45a provided in the pair of electrode holes 42 in this way, it is possible to extremely decrease the size of the pair of electrodes 46 exposed into the integrating sphere 10. That is, it is possible to extremely decrease a portion that absorbs the measurement target light within the integrating sphere 10. Accordingly, it is possible to highly accurately measure the quantum efficiency according to the EL method.

The terminal 58 is electrically connected to the second column 45b. Accordingly, it is possible to supply at least one of a current and a voltage to the second column 45b, for example, only by mounting the plate 40 on the concave portion 57 of the holder 50 so that the electrode 46 contacts the second column 45b. That is, it is possible to supply a current and/or a current to the sample 2 by a simple configuration.

The power source 4 is electrically connected to the second column 45b. Accordingly, it is possible to supply at least one of a current and a voltage to the sample 2.

The electric detector 5 is electrically connected to the second column 45b and detects at least one of a current and a voltage generated in the sample 2. Accordingly, it is possible to detect, for example, at least one of a current and a voltage generated in the sample 2 by the irradiation of the excitation light.

The end surface 31b presses the plate 40 against the bottom surface 57a. In the disposing step S3, the adapter 30 is attached to the holder 50 so that the plate 40 is pressed against the bottom surface 57a. Accordingly, it is possible to easily hold the plate 40 by the concave portion 57 of the holder 50 by a simple operation. Accordingly, it is possible to suppress a risk that the inside of the concave portion 57 is scratched or contaminated at the time of fixing the transparent substrate 41 to the concave portion 57. That is, it is possible to further suppress a decrease in reflectance of the measurement target light within the concave portion 57. Thus, it is possible to measure the quantum efficiency of the sample 2 with higher accuracy. Further, it is possible to maintain a state in which the terminal 58 contacts the second column 45b by pressing the plate 40 against the bottom surface 57a. Thus, it is possible to more reliably maintain a state in which the electrode 46 and the second column 45b are electrically connected to each other. That is, it is possible to more reliably supply at least one of a current and a voltage to the sample 2.

The thickness of the plate 40 is equal to or smaller than the height of the side surface 57b from the bottom surface 57a. When the thickness of the plate 40 is thicker than the height of the side surface 57b, there is concern that a gap may be formed between the end surface 31b of the adapter 30 and the end surface 56 of the mounting portion 55 of the holder 50. In this case, when the measurement target light is incident to, for example, a component (for example, the through-hole 32c of the holder cover 32) not coated with the reflective material through the gap, there is a possibility that the measurement target light may be absorbed to the component. Therefore, since the generation of the gap formed between the end surface 31b and the end surface 56 is suppressed by setting the thickness of the plate 40 to be equal to or smaller than the height of the side surface 57b from the bottom surface 57a, it is possible to further suppress the measurement target light from being absorbed inside the integrating sphere 10. Thus, it is possible to measure the light emission characteristics such as the quantum efficiency of the sample 2 with higher accuracy.

The guide hole 31c has a tapered shape which increases in diameter toward the center portion C0 of the integrating sphere 10. Accordingly, since the shape of the guide hole 31c can be made similar to the shape of the inner wall surface of the integrating sphere 10, it is possible to measure the measurement target light with higher accuracy. That is, it is possible to measure the light emission characteristics such as the quantum efficiency of the sample 2 with higher accuracy.

Figure 16:
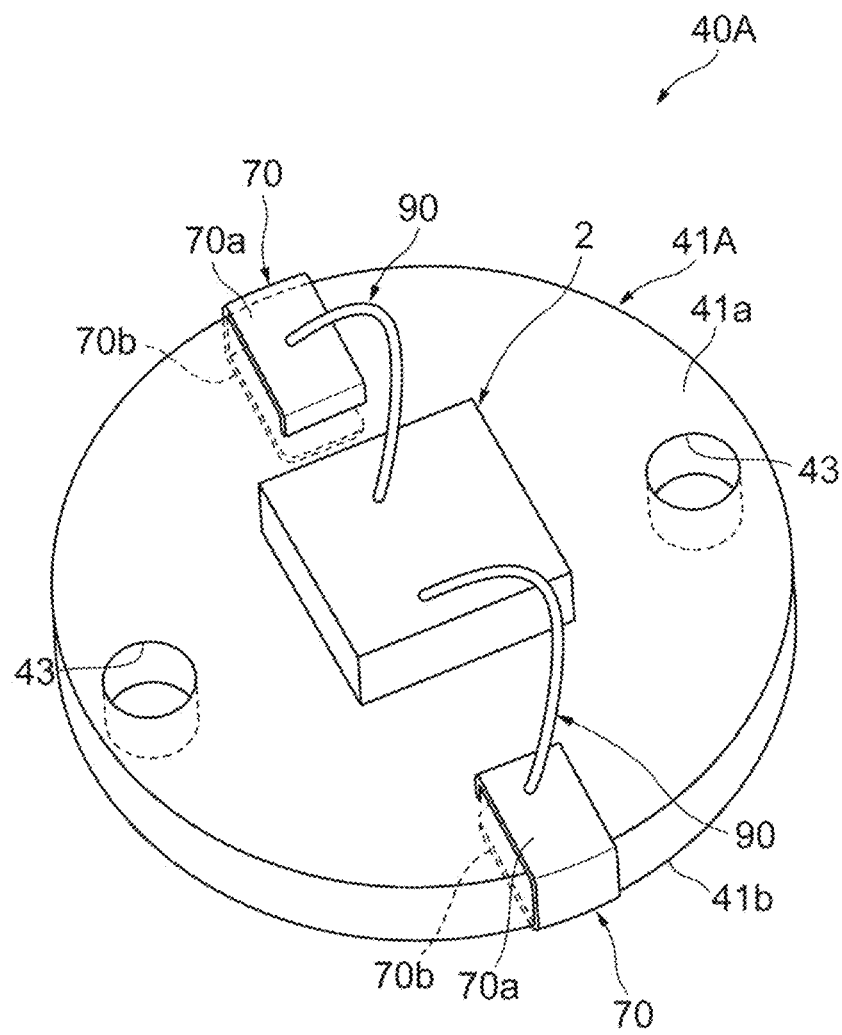
FIG. 16 is a perspective view of a plate according to a modified example.

(Modified Example) FIG. 16 is a perspective view of a plate 40A according to a modified example of the above-described embodiment. FIG. 17 is a perspective view of a mounting portion 55A according to the modified example. This modified example is different from the above-described embodiment in that the plate 40A includes a pair of clip electrodes 70 instead of the pair of metal pins 45, a transparent substrate 41A does not include the pair of electrode holes 42, and a concave portion 57A of the mounting portion 55A further includes a pair of electrode concave portions 80. As illustrated in FIG. 16, the clip electrodes 70 are attached so that both end portions of the transparent substrate 41A in the X direction are interposed therebetween. The clip electrode 70 includes an upper electrode 70a exposed to the first surface 41a and a lower electrode 70b exposed to the second surface 41b. The upper electrode 70a is a first electrode of the modified example and the lower electrode 70b is a second electrode of the modified example. The upper electrode 70a is provided on the first surface 41a. The upper electrode 70a is electrically connected to the sample 2 through a bonding wire 90. The lower electrode 70b is connected to the upper electrode 70a and is provided on the second surface 41b. The lower electrode 70b is electrically connected to the upper electrode 70a. The pair of electrode concave portions 80 is provided along the outer shapes of the pair of clip electrodes 70. As illustrated in FIG. 17, the pair of electrode concave portions 80 is provided from a portion including each of the pair of electrode holes 57c of the bottom surface 57a to the side surface 57b. The lower electrodes 70b of the pair of clip electrodes 70 are respectively accommodated in the pair of electrode concave portions 80. The terminals 58 protruding from the electrode holes 57c of the pair of electrode concave portion 80 respectively contact the lower electrodes 70b of the pair of clip electrodes 70. Accordingly, the pair of lower electrodes 70b is respectively electrically connected to the pair of terminals 58.

The spectrometry device and the spectrometry method of the disclosure are not limited to the embodiment and example described above and can be modified into various other forms. For example, the embodiment and modified example described above may be combined with each other in response to the necessary purpose and effect.

REFERENCE SIGNS LIST

1: spectrometry device, 2: sample, 3: excitation light supply unit, 3a: excitation light source, 3b: light guide, 4: power source, 5: electric detector, 6: data processing unit, 10: integrating sphere, 10a: inner wall surface, 11, 12, 13: attachment hole, 14: spare hole, 15: attachment screw hole, 20: sample attachment portion, 30: adapter, 31a, 31b, 32a, 32b, 56: end surface, 31c: guide hole, 31d, 32d: flange portion, 32: holder cover, 32c: through-hole, 33, 43: positioning hole, 40, 40A: plate, 41, 41A: transparent substrate, 41a: first surface, 41b: second surface, 42: electrode hole, 42a: step surface, 42b: first hole portion, 42c: second hole portion, 45: metal pin, 45a: first column, 45b: second column, 46: electrode, 50: holder, 51: main body, 51a: attachment portion, 51b: groove portion, 51i, 57d: positioning pin, 51d: small diameter portion, 51e: wiring, 55, 55A: mounting portion, 57, 57A: concave portion, 57a: bottom surface, 57b: side surface, 57c: electrode hole, 58: terminal, 60: spectral detector, 70: clip electrode, 70a: upper electrode, 70b: lower electrode, 80: electrode concave portion, 90: bonding wire.

The invention claimed is:

1. A spectrometry device for measuring measurement target light emitted from a sample, comprising:
    an integrating sphere which includes an inner wall surface reflecting the measurement target light and an attachment hole extending outward from the inner wall surface;
    an adapter which includes a guide hole guiding the measurement target light and is disposed in the attachment hole;
    a plate which includes a first surface covering the guide hole from the outside of the integrating sphere and allowing the sample to be mounted thereon and a second surface disposed on the side opposite to the first surface and through which the measurement target light is transmitted;
    a holder which includes a concave portion accommodating the plate and is attached to the integrating sphere; and
    a spectral detector configured to detect the measurement target light output from the integrating sphere,
    wherein the concave portion includes a bottom surface facing the second surface and a side surface surrounding the periphery of the plate, and
    wherein the bottom surface and the side surface are coated with a reflective material reflecting the measurement target light.

2. The spectrometry device according to claim 1, wherein the plate is fitted to the side surface.

3. The spectrometry device according to claim 1, wherein the plate further includes a first electrode exposed to the first surface and a second electrode exposed to the second surface, and
    wherein the first electrode and the second electrode are electrically connected to each other.

4. The spectrometry device according to claim 3, wherein the plate further includes a through-hole extending from the first surface to the second surface and a first conductor provided inside the through-hole, and
    wherein the first conductor electrically connects the first electrode to the second electrode.

5. The spectrometry device according to claim 3, wherein the concave portion further includes a hole portion provided in the bottom surface and a second conductor provided inside the hole portion, and
    wherein the second conductor is electrically connected to the second electrode.

6. The spectrometry device according to claim 5, further comprising:
    a power source which is electrically connected to the second conductor.

7. The spectrometry device according to claim 5, further comprising:
an electric detector which is electrically connected to the second conductor and configured to detect at least one of a current and a voltage generated in the sample.

8. The spectrometry device according to claim 1,
wherein the adapter further includes a pressing portion which presses the plate against the bottom surface.

9. The spectrometry device according to claim 1,
wherein the thickness of the plate is equal to or smaller than the height of the side surface from the bottom surface.

10. The spectrometry device according to claim 1,
wherein the guide hole has a tapered shape which increases in diameter toward a center portion of the integrating sphere.

11. A spectrometry method for measuring measurement target light emitted from a sample by using an integrating sphere including an inner wall surface reflecting the measurement target light and an attachment hole extending outward from the inner wall surface, comprising:

mounting the sample on a first surface of a plate which includes the first surface and a second surface disposed on the side opposite to the first surface and through which the measurement target light is transmitted;

accommodating the plate in a concave portion of a holder including the concave portion provided with a bottom surface facing the second surface and a side surface surrounding the periphery of the plate;

disposing an adapter with a guide hole guiding the measurement target light on the plate so that the guide hole is covered by the first surface from the outside of the integrating sphere, attaching the holder to the integrating sphere, and disposing the adapter in the attachment hole; and detecting the measurement target light output from the integrating sphere by a spectral detector, wherein the bottom surface and the side surface are coated with a reflective material reflecting the measurement target light.

* * * * *